US 6,189,986 B1

(12) United States Patent
Shimizu et al.

(10) Patent No.: US 6,189,986 B1
(45) Date of Patent: Feb. 20, 2001

(54) BRAKING FORCE CONTROL APPARATUS

(75) Inventors: Satoshi Shimizu; Yoshiyuki Hashimoto, both of Susono (JP)

(73) Assignee: Toyota Jidosha Kabushiki Kaisha, Toyota (JP)

( * ) Notice: Under 35 U.S.C. 154(b), the term of this patent shall be extended for 0 days.

(21) Appl. No.: 09/171,644

(22) PCT Filed: Apr. 24, 1997

(86) PCT No.: PCT/JP97/01436

§ 371 Date: Jan. 21, 1999

§ 102(e) Date: Jan. 21, 1999

(87) PCT Pub. No.: WO97/41013

PCT Pub. Date: Nov. 6, 1997

(30) Foreign Application Priority Data

Apr. 26, 1996 (JP) .................................................. 8-108181

(51) Int. Cl.⁷ ...................................................... B60T 8/60
(52) U.S. Cl. ...................... 303/155; 303/113.4; 303/176; 303/167
(58) Field of Search ................................. 303/113.4, 155, 303/3, 15, 176, 191, 121, 9.62, 9.63, 125, 114.3, 113.3, 113.2, 171, 174, 166–167, DIG. 3, DIG. 4, 116.1–119.1

(56) References Cited

U.S. PATENT DOCUMENTS 5,158,343   10/1992   Reichelt et al. .
5,261,730   11/1993   Steiner et al. .

(List continued on next page.)

FOREIGN PATENT DOCUMENTS 0711695   5/1996   (EP) .
2282649   9/1995   (GB) .
2295209   5/1996   (GB) .

(List continued on next page.)

OTHER PUBLICATIONS

Copending U.S. application Ser. No. 09/155,769, filed Oct. 2, 1998.
Copending U.S. application Ser. No. 09/171,498, filed Oct. 20, 1998.
Copending U.S. application Ser. No. 09/171,587, filed Oct. 21, 1998.
Copending U.S. application Ser. No. 09/171,582, filed Oct. 21, 1998.
Copending U.S. application Ser. No. 09/171,588, filed Oct. 21, 1998.

(List continued on next page.)

*Primary Examiner*—Robert J. Oberleitner
*Assistant Examiner*—Devon Kramer

(57) ABSTRACT

A braking force control apparatus adapted to generate a braking force, which is larger than that generated in a regular case, when a predetermined braking operation is carried out, this apparatus aiming at preventing the occurrence of an unnecessarily large sensible deceleration during a low-speed travel of a vehicle. ECU (10) is adapted to judge whether or not an emergency braking operation has been executed on the basis of a master cylinder pressure (Pmc) and its rate of change (dPmc). When a judgement that an emergency braking operation has been carried out is given, a wheel cylinder pressure (Pwc) is quickly increased by supplying an accumulator pressure to the wheel cylinder. When a vehicle speed exceeds a predetermined level during the execution of the emergency braking operation, the wheel cylinder pressure (Pwc) is speedily increased (116, 118) by a braking assist regular control operation. When the vehicle speed is not higher than a predetermined level during the execution of the emergency braking operation, the wheel cylinder pressure (Pwc) is slowly increased (116, 120) by a braking assist starting special control operation.

10 Claims, 8 Drawing Sheets

U.S. PATENT DOCUMENTS

| | | |
|---|---|---|
| 5,350,225 | 9/1994 | Steiner et al. . |
| 5,367,942 | 11/1994 | Nell et al. . |
| 5,427,442 | 6/1995 | Heibel . |
| 5,445,444 | 8/1995 | Rump et al. . |
| 5,492,397 | 2/1996 | Steiner et al. . |
| 5,496,099 | 3/1996 | Resch . |
| 5,499,866 | 3/1996 | Brugger et al. . |
| 5,513,906 | 5/1996 | Steiner . |
| 5,535,123 | 7/1996 | Rump et al. . |
| 5,549,369 | 8/1996 | Rump et al. . |
| 5,556,173 | 9/1996 | Steiner et al. . |
| 5,564,797 * | 10/1996 | Steiner et al. ............ 303/113.4 |
| 5,567,021 * | 10/1996 | Gaillard ........................ 303/3 |
| 5,584,542 | 12/1996 | Klarer et al. . |
| 5,586,814 | 12/1996 | Steiner . |
| 5,658,055 | 8/1997 | Dieringer et al. . |
| 5,660,448 | 8/1997 | Kiesewetter et al. . |
| 5,669,676 | 9/1997 | Rump et al. . |
| 5,719,769 * | 2/1998 | Brugger et al. ........... 303/113.4 |
| 5,720,532 | 2/1998 | Steiner et al. . |
| 5,772,290 | 6/1998 | Heibel et al. . |

FOREIGN PATENT DOCUMENTS

| | | |
|---|---|---|
| 61-268560 | 11/1986 | (JP) . |
| 3-227766 | 10/1991 | (JP) . |
| 4-121260 | 4/1992 | (JP) . |
| 4-121600 | 4/1992 | (JP) . |
| 5-97022 | 4/1993 | (JP) . |
| 7-017390 | 1/1995 | (JP) . |
| 7-076267 | 3/1995 | (JP) . |
| 7-329766 | 12/1995 | (JP) . |
| 8-040229 | 2/1996 | (JP) . |
| 8-34326 | 2/1996 | (JP) . |
| 8-40229 | 2/1996 | (JP) . |
| 8-225070 | 9/1996 | (JP) . |
| 8-295224 | 11/1996 | (JP) . |
| 9-048340 | 2/1997 | (JP) . |
| WO 96/6763 | 3/1996 | (WO) . |

OTHER PUBLICATIONS

Copending U.S. application Ser. No. 09/171,507, filed Oct. 21, 1998.

Copending U.S. application Ser. No. 09/171,589, filed Oct. 21, 1998.

Copending U.S. application Ser. No. 09/171,645, filed Oct. 22, 1998.

Copending U.S. application Ser. No. 09/180,014, filed Oct. 29, 1998.

Copending U.S. application Ser. No. 09/194, 136, filed Nov. 25, 1998.

Copending U.S. application No. 09/108,007, filed Jun. 30, 1998.

* cited by examiner

BRAKING FORCE CONTROL APPARATUS

FIELD OF THE INVENTION

The present invention generally relates to a braking force control apparatus, and more particularly to a braking force control apparatus which generates a braking force larger than that generated during a normal control, when a braking operation that satisfies a predetermined execution condition is performed.

DESCRIPTION OF THE RELATED ART

As disclosed in Japanese Laid-Open Patent Application No. 4-121260, there is known a braking force control apparatus which generates an increased braking force larger than a braking force during a normal control, when it is detected that an emergency braking operation is performed on an automotive vehicle. The conventional apparatus of the above publication is provided with a brake booster which generates a boosted pressure in response to a braking operation force Fp on a brake pedal of the vehicle, or the boosted pressure being equal to the braking operation force Fp multiplied by a given magnification factor. The boosted pressure is delivered from the brake booster to a master cylinder. The master cylinder generates a master cylinder pressure Pmc in response to the boosted pressure delivered from the brake booster, and the master cylinder pressure Pmc is proportional to the braking operation force Fp.

Further, the conventional apparatus of the above publication is provided with a high-pressure source having a pump which generates a brake-assist pressure. The high-pressure source generates a brake-assist pressure in accordance with a drive signal supplied by a control circuit. When a speed of the braking operation of the brake pedal exceeds a given speed, it is determined that an emergency braking operation is performed by a vehicle operator, and the control circuit supplies a drive signal to the high-pressure source, the drive signal requesting a maximum brake-assist pressure to be generated by the high-pressure source. Both the brake-assist pressure generated by the high-pressure source and the master cylinder pressure Pmc generated by the master cylinder are supplied to a switching valve, and the switching valve delivers a larger one of the brake-assist pressure and the master cylinder Pmc to wheel cylinders of the vehicle.

In the conventional apparatus of the above publication, when the speed of the braking operation is below the given speed, the master cylinder pressure Pmc, which is proportional to the braking operation force Fp, is supplied to the wheel cylinders. Hereinafter, the control that is performed to generate the braking force by the braking operation under such a condition will be called a normal control. On the other hand, when the speed of the braking operation is above the given speed, the brake-assist pressure, which is generated by the high-pressure source, is supplied to the wheel cylinders. Hereinafter, the control that is performed to generate an increased braking force larger than the braking force generated during the normal control, under such a condition, will be called a brake-assist control.

In the conventional apparatus of the above publication, when the braking operation of the brake pedal is performed at a normal speed, the braking force is controlled to the magnitude that is proportional to the braking operation force Fp, and, when the emergency braking operation of the brake pedal is performed, the braking force is quickly increased to be larger than the braking force during the normal control.

In the conventional apparatus of the above publication, the braking force acting on the vehicle after the brake-assist control is started is speedily increased to a maximum braking force at the time of a maximum braking operation force acting on the brake pedal. Generally, a deceleration that the vehicle occupant senses in response to the maximum braking operation force acting on the brake pedal when the vehicle is running at a high speed is smaller than that when the vehicle is running at a low speed. If the brake-assist control is performed for both during the high-speed running and during the low-speed running in the same manner, the ride comfort as a result of the execution of the brake-assist control during the low-speed running is likely to become degraded.

In the conventional apparatus of the above publication, when a braking operation that satisfies a predetermined execution condition is performed, the brake-assist control is always performed in the same manner regardless of whether the vehicle speed is high or low. Therefore, when the brake-assist control is performed during the low-speed running, the conventional apparatus can speedily increase the braking force that acts on the vehicle after the brake-assist control is started. However, the conventional apparatus produces an unnecessarily large deceleration after the brake-assist control is started in such a case, and the ride comfort will be degraded.

SUMMARY OF THE INVENTION

A general object of the present invention is to provide an improved braking force control apparatus in which the above-described problems are eliminated.

Another, more specific object of the present invention is to provide a braking force control apparatus which changes a rate of increase of a braking force accompanied by a start of a brake-assist control, in accordance with a vehicle speed, preventing an unnecessarily large deceleration from being produced by the brake-assist control during a low-speed running of the vehicle.

In order to achieve the above-mentioned objects, one aspect of the present invention is to provide a braking force control apparatus which includes a means for performing a normal control to generate a braking force on a vehicle in accordance with a braking operation force, and a means for performing a brake-assist control to generate an increased braking force larger than the braking force generated during the normal control, characterized in that the apparatus comprises a braking force increasing characteristic change means for changing a rate of increase of the braking force accompanied by a start of the brake-assist control, in accordance with a vehicle speed.

According to the above-described braking force control apparatus of the present invention, when a predetermined braking operation is performed, the execution of the normal control is stopped and the execution of brake-assist control is started. After the start of the execution of the brake-assist control, the braking force on the vehicle is increased. The vehicle occupant senses a large deceleration if the braking force on the vehicle is too quickly increased. The sensed deceleration of the vehicle occupant depends upon the vehicle speed. The lower the vehicle speed, the larger the sensed deceleration. As the braking force control apparatus of the present invention is provided with the braking force increasing characteristic change means, it is possible to change the rate of increase of the braking force produced after the start of the brake-assist control, in accordance with the vehicle speed. Hence, the braking force control apparatus of the present invention is effective in achieving the functions of the brake-assist control in an appropriate manner for all the ranges of the vehicle speed without degrading the ride comfort of the vehicle occupant.

In a preferred embodiment of the present invention, the braking force control apparatus may be constructed such that the braking force increasing characteristic change means decreases the rate of increase of the braking force in accordance with a decrease in the vehicle speed.

According to the above-described braking force control apparatus of the present invention, the rate of increase of the braking force produced after the start of the brake-assist control will decrease as the vehicle speed becomes lower. Hence, it is possible to prevent an unnecessarily large deceleration from being produced after the start of the brake-assist control during a low-speed running of the vehicle.

In another preferred embodiment of the present invention, the braking force control apparatus may be constructed such that the braking force increasing characteristic change means decreases a rate of increase of a braking force on rear wheels of the vehicle in accordance with a decrease in the vehicle speed.

According to the above-described braking force control apparatus of the present invention, the rate of increase of the braking force on the rear wheels produced after the start of the brake-assist control will decrease as the vehicle speed becomes lower. The rate of increase of the entire braking force on the vehicle produced after the start of the brake-assist control will also decrease as the vehicle speed becomes lower. Hence, it is possible to prevent an unnecessarily large deceleration from being produced after the start of the brake-assist control during a low-speed running of the vehicle.

Further, in a preferred embodiment of the present invention, the braking force control apparatus may be constructed such that the braking force increasing characteristic change means delays a time to start increasing a braking force on rear wheels of the vehicle after the start of the brake-assist control from a time to start increasing a braking force on front wheels of the vehicle after the start of the brake-assist control by a delay time, wherein the delay time is increased in accordance with a decrease in the vehicle speed.

According to the above-described braking force control apparatus of the present invention, the time to start increasing the braking force on the rear wheels is delayed from the time to start increasing the braking force on the front wheels by the delay time, and the delay time is increased in accordance with a decrease in the vehicle speed. The braking force control apparatus of the present invention initially generates a relatively large braking force on the front wheels and a relatively small braking force on the rear wheels. Hence, the braking force control apparatus of the present invention is effective in providing a good vehicle running stability when an emergency braking operation is performed.

BRIEF DESCRIPTION OF THE DRAWINGS

Other objects, features and advantages of the present invention will be more apparent from the following detailed description when read in conjunction with the accompanying drawings in which.

DESCRIPTION OF THE PREFERRED EMBODIMENTS

A description will now be given of the preferred embodiments of the present invention with reference to the accompanying drawings.

Figure 1:
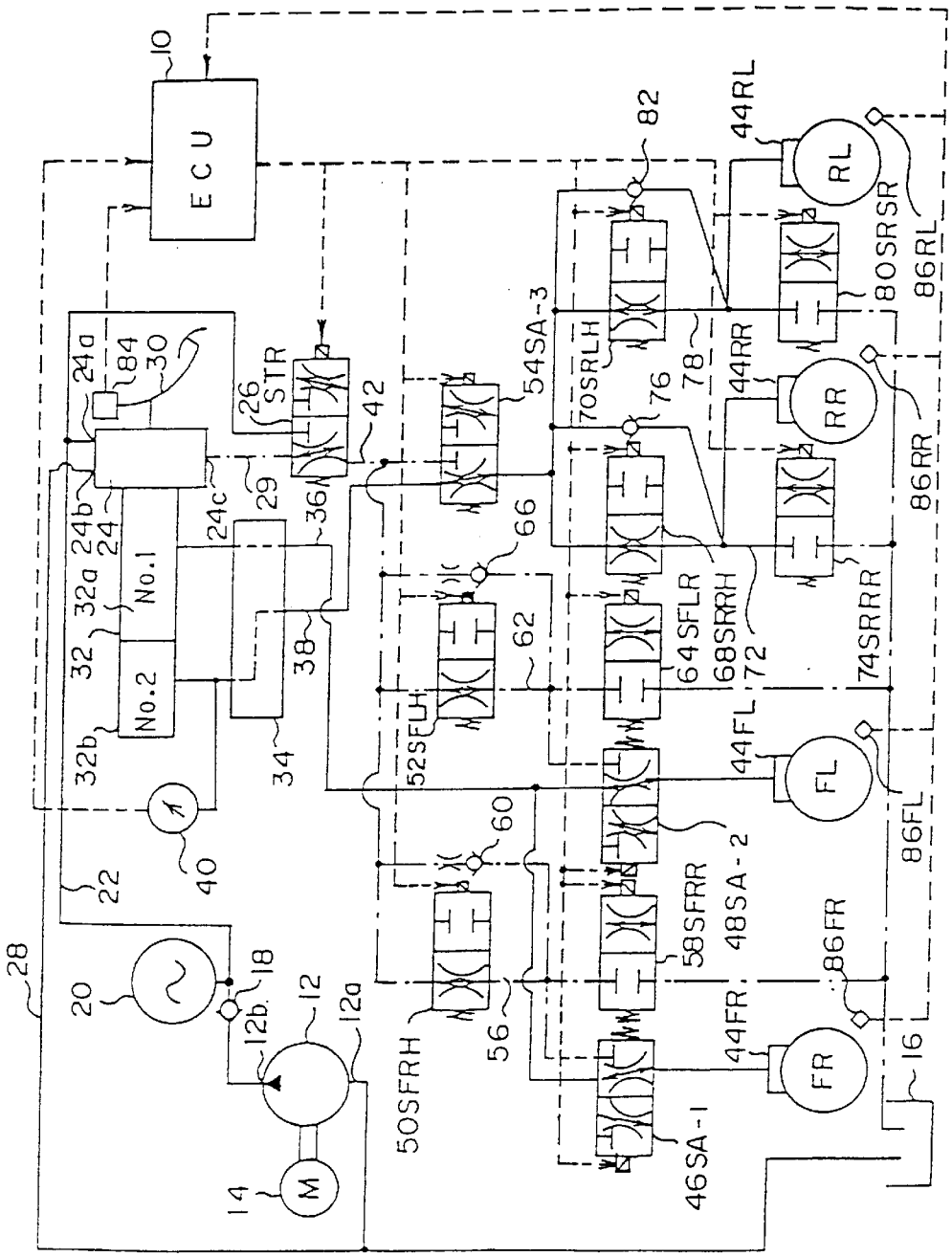
FIG. 1 is a system block diagram of a braking force control apparatus to which one of a first embodiment and a second embodiment of the present invention is applied.

FIG. 1 shows one embodiment of the braking force control apparatus of the present invention. The braking force control apparatus of FIG. 1 is incorporated in an automotive vehicle, and controlled by an electronic control unit 10 (hereinafter, called ECU 10).

In FIG. 1, input signal paths through which signals supplied by certain elements of the braking force control apparatus are sent to the ECU 10, and output signal paths through which signals supplied by the ECU 10 are sent to certain elements of the braking force control apparatus are indicated by the dotted-line arrows in FIG. 1. Further, brake fluid paths through which brake fluid is supplied between the elements of the braking force control apparatus are indicated by the solid lines or the one-dot chain lines in FIG. 1.

The braking force control apparatus includes a pump 12. The pump 12 is provided with an actuating motor 14. The actuating motor 14 actuates the pump 12 so that the pump 12 supplies a high-pressure brake fluid. The pump 12 has an inlet port 12a which is connected to a reservoir tank 16. The pump 12 has an outlet port 12b which is connected to an accumulator 20 via a check valve 18. The pump 12 produces a high-pressure brake fluid from the brake fluid received from the reservoir tank 16, and supplies the high-pressure brake fluid from the outlet port 12b to the accumulator 20 so that the accumulator 20 stores the high-pressure brake fluid supplied by the pump 12. The check valve 18 allows only a flow of the high-pressure brake fluid from the pump 12 to the accumulator 20, and inhibits a counter flow of the brake fluid from the accumulator 20 to the pump 12.

The accumulator 20 is connected through a high-pressure line 22 to a high-pressure port 24a of a regulator 24. The accumulator 20 is further connected through the high-pressure line 22 to a regulator switching solenoid 26 (hereinafter, called STR 26). The regulator 24 has a low-pressure port 24b which is connected through a low-pressure line 28 to the reservoir tank 16. The regulator 24 has a controlled-pressure port 24c which is connected through a controlled-pressure line 29 to the STR 26. The STR 26 is a two-position solenoid valve which selectively opens one of the high-pressure line 22 and the controlled-pressure line 29 and closes the other. The STR 26 is normally set in a first position so that the STR 26 opens the controlled-pressure line 29 and closes the high-pressure line 22. When a drive signal is supplied to the STR 26 by the ECU 10, the STR 26 is set in a second position so that the STR 26 closes the controlled-pressure line 29 and opens the high-pressure line 22. A brake pedal 30 is connected to the regulator 24, and a master cylinder 32 is fixed to the regulator 24. The regulator 24 contains a pressure chamber therein, and the controlled-pressure port 24c is open to the pressure chamber of the regulator 24. In the regulator 24, one of the high-pressure port 24a and the low-pressure port 24b is selectively connected to the pressure chamber in response to a condition (a speed or a quantity) of the braking operation of the brake pedal 30.

The regulator 24 is arranged such that the internal pressure of the pressure chamber is adjusted to a brake fluid pressure proportional to the braking operation force Fp on the brake pedal 30. Hence, the brake fluid pressure proportional to the braking operation force Fp is present at the controlled-pressure port 24c of the regulator 24. Hereinafter, this brake fluid pressure will be called the regulator pressure Pre.

The braking operation force Fp exerted on the brake pedal 30 is mechanically transmitted to the master cylinder 32 via the regulator 24. In addition, a force proportional to the regulator pressure Pre at the controlled-pressure port 24c of the regulator 24 is transmitted to the master cylinder 32. Hereinafter, this force will be called the brake-assist force Fa. Hence, when the brake pedal 30 is depressed, a resultant force of the braking operation force Fp and the brake-assist force Fa is transmitted to the master cylinder 32.

The master cylinder 32 includes a first pressure chamber 32a ("No. 1") and a second pressure chamber 32b ("No. 2") provided therein. In the master cylinder 32, a master cylinder pressure Pmc, which is proportional to the resultant force of the braking operation force Fp and the brake-assist force Fa, is produced in both the first pressure chamber 32a and the second pressure chamber 32b. A proportioning valve 34 (hereinafter, called the P valve 34) is connected to both the first pressure chamber 32a and the second pressure chamber 32b of the master cylinder 32. Hence, both the master cylinder pressure Pmc produced in the first pressure chamber 32a and the master cylinder pressure Pmc produced in the second pressure chamber 32b are supplied to the P valve 34.

A first pressure line 36 and a second pressure line 38 are connected to the P valve 34. When the master cylinder pressure Pmc is below a reference pressure, the P valve 34 supplies the master cylinder pressure Pmc to both the first pressure line 36 and the second pressure line 38. When the master cylinder pressure Pmc is above the reference pressure, the P valve 34 supplies the master cylinder pressure Pmc to the first pressure line 36 and supplies a reduced pressure to the second pressure line 38. The reduced pressure, supplied to the second pressure line 38 in this case, is equal to the master cylinder pressure Pmc multiplied by a given reduction ratio.

A hydraulic pressure sensor 40 is connected to the brake fluid path between the P valve 34 and the second pressure chamber 32b of the master cylinder 32. The hydraulic pressure sensor 40 outputs a signal, indicative of the master cylinder pressure Pmc, to the ECU 10. The ECU 10 detects the master cylinder pressure Pmc, produced in the master cylinder 32, based on the signal supplied by the hydraulic pressure sensor 40.

A third pressure line 42 is connected to the STR 26. As described above, the STR 26 selectively opens one of the high-pressure line 22 and the controlled-pressure line 29 and closes the other. The brake fluid pressure from one of the high-pressure line 22 and the controlled-pressure line 29 is supplied to the third pressure line 42 according to the position of the STR 26. In the present embodiment, the brake fluid pressure from one of the first pressure line 36 connected to the P valve 34 and the third pressure line 42 connected to the STR 26, is supplied to both a wheel cylinder 44FR and a wheel cylinder 44FL, which are respectively provided on a front-right wheel ("FR") and a front-left wheel ("FL") of the vehicle. Further, in the present embodiment, the brake fluid pressure from one of the second pressure line 38 connected to the P valve 34 and the third pressure line 42 connected to the STR 26, is supplied to both a wheel cylinder 44RR and a wheel cylinder 44RL, which are respectively provided on a rear-right wheel ("RR") and a rear-left wheel ("RL") of the vehicle.

A first pressure-assisting solenoid-46 (hereinafter, called SA-1 46) and a second pressure-assisting solenoid 48 (hereinafter, called SA-2 48) are connected to the first pressure line 36. A front-right pressure-holding solenoid 50 (hereinafter, called SFRH 50), a front-left pressure-holding solenoid 52 (hereinafter, called SFLH 52), and a third pressure-assisting solenoid 54 (hereinafter, called SA-3 54) are connected to the third pressure line 42.

The SFRH 50 is a two-position solenoid valve which is normally set in a valve-open position. The SFRH 50 is connected through a pressure adjustment line 56 to both the SA-1 46 and a front-right pressure-reducing solenoid 58 (hereinafter, called SFRR 58). When a drive signal is supplied to the SFRH 50 by the ECU 10, the SFRH 50 is set in a valve-closed position so that the SFRH 50 is isolated from or closes the pressure adjustment line 56. A check valve 60 is provided in a bypass line between the third pressure line 42 and the pressure adjustment line 56. The check valve 60 allows only a flow of the brake fluid from the pressure adjustment line 56 to the third pressure line 42, and inhibits a counter flow of the brake fluid from the third pressure line 42 to the pressure adjustment line 56.

The SA-1 46 is a two-position solenoid valve which selectively connects one of the first pressure line 36 and the pressure adjustment line 56 to the wheel cylinder 44FR. The SA-1 46 is normally set in a first position so that the SA-1 46 connects the first pressure line 36 to the wheel cylinder 44FR. When a drive signal is supplied to the SA-1 46 by the ECU 10, the SA-1 46 is a set in a second position so that the SA-1 46 connects the pressure adjustment line 56 to the wheel cylinder 44FR. The SFRR 58 is a two-position solenoid valve which disconnects the pressure adjustment line 56 from or connects the pressure adjustment line 56 to the reservoir tank 16. The SFRR 58 is normally set in a valve-closed position so that the SFRR 58 disconnects the pressure adjustment line 56 from the reservoir tank 16. When a drive signal is supplied to the SFRR 58 by the ECU 10, the SFRR 58 is set in a valve-open position so that the SFRR 58 connects the pressure adjustment line 56 to the reservoir tank 16.

The SFLH 52 is a two-position solenoid valve which is normally set in a valve-open position. The SFLH 52 is connected through a pressure adjustment line 62 to both the SA-2 48 and a front-left pressure-reducing solenoid 64 (hereinafter, called SFLR 64). When a drive signal is supplied to the SFLH 52 by the ECU 10, the SFLH 52 is set in a valve-closed position so that the SFLH 52 is isolated from or closes the pressure adjustment line 62. A check valve 66 is provided in a bypass line between the third pressure line 42 and the pressure adjustment line 62. The check valve 66 allows only a flow of the brake fluid from the pressure adjustment line 62 to the third pressure line 42, and inhibits a counter flow of the brake fluid from the third pressure line 42 to the pressure adjustment line 62.

The SA-2 48 is a two-position solenoid valve which selectively connects one of the first pressure line 36 and the pressure adjustment line 62 to the wheel cylinder 44FL. The SA-2 48 is normally set in a first position so that the SA-2 48 connects the first pressure line 36 to the wheel cylinder 44FL. When a drive signal is supplied to the SA-2 48 by the ECU 10, the SA-2 48 is set in a second position so that the SA-2 48 connects the pressure adjustment line 62 to the wheel cylinder 44FL. The SFLR 64 is a two-position solenoid valve which disconnects the pressure adjustment line 62 from or connects the pressure adjustment line 62 to the reservoir tank 16. The SFLR 64 is normally set in a valve-closed position so that the SFLR 64 disconnects the pressure adjustment line 62 from the reservoir tank 16. When a drive signal is supplied to the SFLR 64 by the ECU 10, the SFLR 64 is set in a valve-open position so that the SFLR 64 connects the pressure adjustment line 62 to the reservoir tank 16.

The second pressure line 38 at the output of the P valve 34 is connected to the SA-3 54. A rear-right pressure-holding solenoid 68 (hereinafter, called SRRH 68) and a rear-left pressure-holding solenoid 70 (hereinafter, called SRLH 70) are connected to the downstream side of the SA-3 54. The SRRH 68 and the SRLH 70 are respectively provided for the wheel cylinder 44RR and the wheel cylinder 44RL.

The SA-3 54 is a two-position solenoid valve which selectively connects one of the second pressure line 38 and the third pressure line 42 to the SRRH 68 and the SRLH 70. The SA-3 54 is normally set in a first position so that the SA-3 54 connects the second pressure line 38 to the SRRH 68 and the SRLH 70. When a drive signal is supplied to the SA-3 54 by the ECU 10, the SA-3 54 is set in a second position so that the SA-3 54 connects the third pressure line 42 to the SRRH 68 and the SRLH 70.

The SRRH 68 is a two-position solenoid valve which is normally set in a valve-open position. The downstream side of the SRRH 68 is connected through a pressure adjustment line 72 to both the wheel cylinder 44RR and a rear-right pressure-reducing solenoid 74 (hereinafter, called SRRR 74). When a drive signal is supplied to the SRRH 68 by the ECU 10, the SRRH 68 is set in a valve-closed position so that the SRRH 68 is isolated from or closes the pressure adjustment line 72. The SRRR 74 is a two-position solenoid valve which disconnects the pressure adjustment line 72 from or connects the pressure adjustment line 72 to the reservoir tank 16. The SRRR 74 is normally set in a valve-closed position so that the SRRR 74 disconnects the pressure adjustment line 72 from the reservoir tank 16. When a drive signal is supplied to the SRRR 74 by the ECU 10, the SRRR 74 is set in a valve-open position so that the SRRR 74 connects the pressure adjustment line 72 to the reservoir tank 16. A check valve 76 is provided in a bypass line between the SA-3 54 and the pressure adjustment line 72. The check valve 76 allows only a flow of the brake fluid from the pressure adjustment line 72 to the SA-3 54, and inhibits a counter flow of the brake fluid from the SA-3 54 to the pressure adjustment line 72.

The SRLH 70 is a two-position solenoid valve which is normally set in a valve-open position. The downstream side of the SRLH 70 is connected through a pressure adjustment line 78 to both the wheel cylinder 44RL and a rear-left pressure-reducing solenoid 80 (hereinafter, called SRLR 80). When a drive signal is supplied to the SRLH 70 by the ECU 10, the SRLH 70 is set in a valve-closed position so that the SRLH 70 is isolated from or closes the pressure adjustment line 78. The SRLR 80 is a two-position solenoid valve which disconnects the pressure adjustment line 78 from or connects the pressure adjustment line 78 to the reservoir tank 16. The SRLR 80 is normally set in a valve-closed position so that the SRLR 80 disconnects the pressure adjustment line 78 from the reservoir tank 16. When a drive signal is supplied to the SRLR 80 by the ECU 10, the SRLR 80 is set in a valve-open position so that the SRLR 80 connects the pressure adjustment line 78 to the reservoir tank 16. A check valve 82 is provided in a bypass line between the SA-3 54 and the pressure adjustment line 78. The check valve 82 allows only a flow of the brake fluid from the pressure adjustment line 78 to the SA-3 54, and inhibits a counter flow of the brake fluid from the SA-3 54 to the pressure adjustment line 78.

In the braking force control apparatus of FIG. 1, a brake switch 84 is provided in the vicinity of the brake pedal 30. When the brake pedal 30 is depressed by the vehicle operator, the brake switch 84 outputs an ON signal to the ECU 10. The ECU 10 determines whether the braking operation is performed by the vehicle operator, based on the signal supplied by the brake switch 84.

In the braking force control apparatus of FIG. 1, a wheel speed sensor 86FR, a wheel speed sensor 86FL, a wheel speed sensor 86RR and a wheel speed sensor 86RL are provided in the vicinity of the front-right wheel FR, the front-left wheel FL, the rear-right wheel RR and the rear-left wheel RL of the vehicle, respectively. Hereinafter, these wheel speed sensors will be collectively referred to as the wheel speed sensors 86. Each of the wheel speed sensors 86 outputs a signal, indicative of the wheel speed of the related one of the wheels FR, FL, RR and RL, to the ECU 10. The ECU 10 detects the respective wheel speeds of the wheels FR, FL, RR and RL, based on the signals supplied by the wheel speed sensors 86.

In the braking force control apparatus of FIG. 1, the ECU 10 supplies the respective drive signals to the STR 26, the SA-1 46, the SA-2 48, the SA-3 54, the SFRH 50, the SFLH 52, the SFRR 58, the SFLR 64, the SRRH 68, the SRLH 70, the SRRR 74 and the SRLR 80 in a controlled manner based on the signals supplied by the hydraulic pressure sensor 40, the brake switch 84 and the wheel speed sensors 86.

Next, a description will be given of the operation of the braking force control apparatus of the present embodiment. When the operating condition of the vehicle is found stable, the normal control is performed by the braking force control apparatus of the present embodiment to generate a braking force in accordance with the braking operation force Fp on the brake pedal 30.

In order to perform the normal control by the braking force control apparatus, the ECU 10 supplies no drive signals to the STR 26, the SA-1 46, the SA-2 48, the SA-3 54, the SFRH 50, the SFLH 52, the SFRR 58, the SFLR 64, the SRRH 68, the SRLH 70, the SRRR 74 and the SRLR 80 so that the above solenoids are set in the positions as shown in FIG. 1.

More specifically, when the above solenoids of the braking force control apparatus are in the positions shown in FIG. 1, the wheel cylinders 44FR and 44FL are connected to the first pressure line 36, and the wheel cylinders 44RR and 44RL are connected to the second pressure line 38. In this condition, the master cylinder pressure Pmc from the master cylinder 32 is supplied to and received by the wheel cylinders 44FR, 44FL, 44RL and 44RR (hereinafter, these wheel cylinders will be collectively called the wheel cylinders 44). Hence, in each of the respective wheels FR, FL, RR and RL of the vehicle, the braking force in accordance with the braking operation force Fp is generated.

In the braking force control apparatus of the present embodiment, when it is found that any of the wheels of the vehicle will be locked, it is determined that anti-lock braking system (ABS) control execution conditions are satisfied. After this determination is made, the execution of the ABS control of the braking force control apparatus is started.

The ECU 10 calculates respective wheel speeds Vwfr, Vwfl, Vwrr and Vwrl (hereinafter, these wheel speeds will be collectively called the wheel speeds Vw) of the vehicle wheels based on the signals supplied by the wheel speed sensors 86. By using a known vehicle speed estimation method, the ECU 10 determines an estimated vehicle speed Vso from the calculated wheel speeds Vw. If the braking force is exerted on the vehicle by the braking operation, the ECU 10 calculates a slip ratio S of each of the vehicle wheels from the related wheel speed Vw and the estimated vehicle speed Vso in accordance with the following formula:

$$S = (Vso - Vw) \cdot 100 / Vso \qquad (1)$$

Then, the ECU 10 determines whether the ABS control execution conditions are satisfied based on the slip ratio S of each of the vehicle wheels. When the slip ratio S is found to be above a reference value, it is determined that the ABS control execution conditions are satisfied. When this determination is made, the ECU 10 supplies the drive signals to the SA-1 46, the SA-2 48 and the SA-3 54. When the drive signal is supplied to the SA-1 46, the SA-1 46 is set in the second position so that the SA-1 46 connects the pressure adjustment line 56 to the wheel cylinder 44FR. The SA-1 46 closes off or disconnects the first pressure line 36 from the wheel cylinder 44FR. When the drive signal is supplied to the SA-2 48, the SA-2 48 is set in the second position so that the SA-2 48 connects the pressure adjustment line 62 to the wheel cylinder 44FL. The SA-2 48 closes off or disconnects the first pressure line 36 from the wheel cylinder 44FL. When the drive signal is supplied to the SA-3 54, the SA-3 54 is set in the second position so that the SA-3 54 connects the third pressure line 42 to the SRRH 68 and the SRLH 70. The SA-3 54 closes off or disconnects the second pressure line 38 from the SRRH 68 and the SRLH 70.

When the solenoids 46, 48 and 54 are set in the second positions as described above, the SFRH 50, the SFLH 52, the SRRH 68 and the SRLH 70 (these solenoids will be called the pressure-holding solenoids SH), as well as the SFRR 58, the SFLR 64, the SRRR 74 and the SRLR 80 (these solenoids will be called the pressure-reducing solenoids SR) are connected to the respective wheels cylinders 44, and the regulator pressure Pre from the regulator 24 is supplied to the upstream sides of the pressure-holding solenoids SH through the third pressure line 42 and the STR 26.

During the ABS control of the braking force control apparatus of the present embodiment wherein the solenoids 46, 48 and 54 are set in the second positions as described above, the pressure-holding solenoids SH and the pressure-reducing solenoids SR may be controlled by the ECU 10 such that the pressure-holding solenoids SH are set in the valve-open positions and the pressure-reducing solenoids SR are set in the valve-closed positions. When the ECU 10 performs this control procedure in the braking force control apparatus, a wheel cylinder pressure Pwc of the related one of the wheel cylinders 44 is increased up to the regulator pressure Pre. This control procedure will be called (1) a pressure-increasing control mode.

Alternatively, during the ABS control of the braking force control apparatus of the present embodiment wherein the solenoids 46, 48 and 54 are set in the second positions as described above, the pressure-holding solenoids SH and the pressure-reducing solenoids SR may be controlled by the ECU 10 such that the pressure-holding solenoids SH are set in the valve-closed positions and the pressure-reducing solenoids SR are set in the valve-closed positions. When the ECU 10 performs this control procedure in the braking force control apparatus, the wheel cylinder pressure Pwc of the related one of the wheel cylinders 44 is held at the same level without increase or decrease. Hereinafter, this control procedure will be called (2) a pressure-holding control mode.

Alternatively, during the ABS control of the braking force control apparatus of the present embodiment wherein the solenoids 46, 48 and 54 are set in the second positions as described above, the pressure-holding solenoids SH and the pressure-reducing solenoids SR may be controlled by the ECU 10 such that the pressure-holding solenoids SH are set in the valve-closed positions and the pressure-reducing solenoids SR are set in the valve-open positions. When the ECU 10 performs this control procedure in the braking force control apparatus, the wheel cylinder pressure Pwc of the related one of the wheel cylinders 44 is decreased. This control procedure will be called (3) a pressure-decreasing control mode.

In the braking force control apparatus of the present embodiment, the ECU 10 suitably performs one of (1) the pressure-increasing control mode, (2) the pressure-holding control mode and (3) the pressure-decreasing control mode so as to maintain the slip ratio S of each of the vehicle wheels FR, FL, RR and RL below the reference value, preventing all the vehicle wheels from being locked during the braking operation.

It is necessary to quickly decrease the wheel cylinder pressure Pwc of the related one of the wheel cylinders 44 after the vehicle operator releases the braking operation force on the brake pedal 30 during the ABS control. In the braking force control apparatus of the present embodiment, the check valves 60, 66, 76 and 82 are provided in the brake fluid paths connected to the wheel cylinders 44, so as to allow only the flow of the brake fluid from the pressure adjustment lines 56, 62, 72 and 78 (connected to the wheel cylinders 44) to the third pressure line 42. As the check valves 60, 66, 76 and 82 function in this manner, it is possible for the braking force control apparatus of the present embodiment to quickly decrease the wheel cylinder pressure Pwc after the vehicle operator releases the braking operation force on the brake pedal 30 during the ABS control.

During the ABS control of the braking force control apparatus of the present embodiment, the wheel cylinder pressure Pwc of the related one of the wheel cylinders 44 is suitably adjusted by supplying the regulator pressure Pre from the regulator 24 to the wheel cylinders 44. More specifically, when the brake fluid from the pump 12 is delivered to the wheel cylinders 44, the wheel cylinder pressure Pwc is increased, and, when the brake fluid within the wheel cylinders 44 is returned to the reservoir tank 16, the wheel cylinder pressure Pwc is decreased. If the increase of the wheel cylinder pressure Pwc is performed by using the master cylinder 32 as the only brake fluid pressure source, the brake fluid contained in the master cylinder 32 is gradually decreased through a repeated execution of the pressure-increasing control mode and the pressure-decreasing control mode. In such a condition, the master cylinder 32 may be malfunctioning due to a too small amount of the brake fluid contained in the master cylinder 32.

In order to avoid the malfunction of the master cylinder 32 mentioned above, in the braking force control apparatus of the present embodiment, the increase of the wheel cylinder pressure Pwc is performed by selectively using one of the master cylinder 32 and the pump 12 as the brake fluid pressure source. If the increase of the wheel cylinder pressure Pwc is performed by using the pump 12 as the brake fluid pressure source, the present embodiment can avoid the malfunction of the master cylinder 32. It is possible for the braking force control apparatus of the present embodiment to maintain a stable operating condition even when the ABS control is continuously performed over an extended period of time.

As described above, the execution of the ABS control of the braking force control apparatus of the present embodiment is started when it is found that any of the wheels of the vehicle will be locked. In other words, the prerequisite condition to start the execution of the ABS control of the braking force control apparatus of the present embodiment is that the vehicle operator exerts an adequate braking operation force Fp on the brake pedal 30 so as to produce a large slip ratio S of any of the vehicle wheels which can be detected by the braking force control apparatus.

Figure 2:
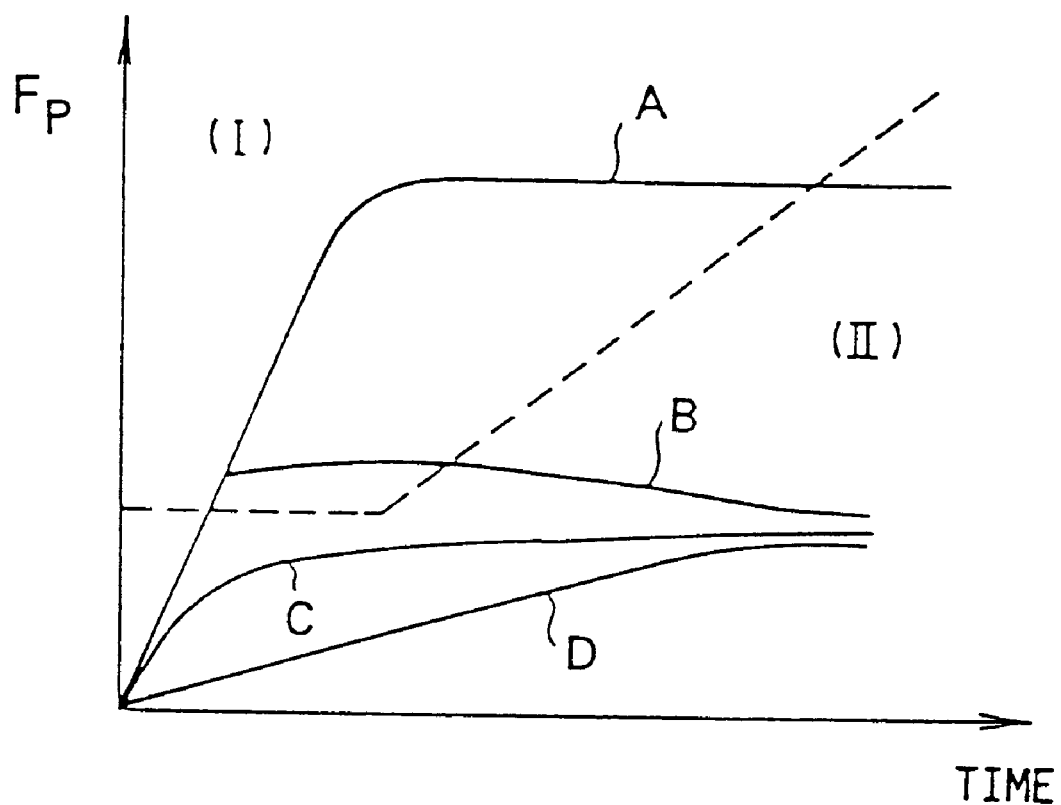
FIG. 2 is a diagram for explaining changes of a braking operation force on a brake pedal with respect to the elapsed time in various situations.

FIG. 2 shows changes of the braking operation force Fp on the brake pedal 30 with respect to the elapsed time in various situations. A change of the braking operation force Fp exerted on the brake pedal 30 by an experienced vehicle operator who is intended to perform an emergency braking operation, and a change of the braking operation force Fp exerted on the brake pedal 30 by a beginner who is intended to perform the emergency braking operation, are indicated by the curve "A" and the curve "B" in FIG. 2, respectively. Generally, it is necessary that the braking operation force Fp during the emergency braking operation is large enough to start the execution of the ABS control of the braking force control apparatus.

As indicated by the curve "A" of FIG. 2, in the case of the experienced vehicle operator, when a condition requiring the emergency braking has occurred, the braking operation force Fp on the brake pedal 30 is quickly raised to an adequately large level, and the braking operation force Fp is maintained at the adequately large level over a certain period of time. In response to the braking operation of the brake pedal 30, an adequately large master cylinder pressure Pmc from the master cylinder 32 is supplied to the wheel cylinders 44, and the ABS control of the braking force control apparatus can be started.

However, as indicated by the curve "B" of FIG. 2, in the case of the beginner, when the condition requiring the emergency braking has occurred, the braking operation force Fp may not be maintained at the adequately large level over a certain period of time although the braking operation force Fp is initially raised to the adequately large level. Hence, in response to the braking operation of the brake pedal 30 by the beginner, an adequately large master cylinder pressure Pmc from the master cylinder 32 may not be supplied to the wheel cylinders 44, and the ABS control of the braking force control apparatus cannot be started.

Generally, beginners who are less experienced in vehicle operation tend to unintentionally release the brake pedal 30 during the emergency braking operation. In the braking force control apparatus of the present invention, a braking force control procedure is performed by the ECU 10 when a brake releasing operation of the brake pedal 30 is determined as being an intentional operation, and this braking force control procedure allows the adequately large master cylinder pressure Pmc of the master cylinder 32 to be supplied to the wheel cylinders 44 even if the braking operation force Fp is not raised to the adequately large level as indicated by the curve "B" in FIG. 2. Hereinafter, this braking force control procedure will be called a brake-assist (BA) control.

Before starting the brake-assist control in the braking force control apparatus of the present invention, it is necessary to determine, with accuracy, whether a braking operation of the brake pedal 30 is intended to perform the emergency braking operation or not.

In FIG. 2, changes of the braking operation force Fp on the brake pedal 30 (which is intended to perform a normal braking operation) with respect to the elapsed time in various situations are indicated by the curves "C" and "D". As indicated by the curves "A" through "D", a rate of change of the braking operation force Fp during the normal braking operation is smaller than a rate of change of the braking operation force Fp during the emergency braking operation. In addition, a convergence value of the braking operation force Fp during the normal braking operation is smaller than that of the braking operation force Fp during the emergency braking operation.

The braking force control apparatus of the present invention takes account of the differences between the braking operation force Fp during the normal braking operation and the braking operation force Fp during the emergency braking operation as shown in FIG. 2. When a rate of change of the braking operation force Fp during an initial period of the braking operation is above a certain reference value and the braking operation force Fp is raised to an adequately large level (which falls within a region (I) above the borderline indicated by a dotted line in FIG. 2), the ECU 10 of the braking force control apparatus of the present invention determines that the braking operation of the brake pedal 30 is intended to perform the emergency braking operation.

On the other hand, when the rate of change of the braking operation force Fp during the initial period of the braking operation is not above the reference value, or when the braking operation force Fp is not raised to the adequately large level (which falls within a region (II) below the borderline indicated by the dotted line in FIG. 2), the ECU 10 of the braking force control apparatus of the present invention determines that the braking operation of the brake pedal 30 is intended to perform the normal braking operation.

In the braking force control apparatus of the present invention, the ECU 10 makes a determination as to whether a speed of the braking operation of the brake pedal 30 is above a given speed, and makes a determination as to whether a quantity of the braking operation of the brake pedal 30 is above a reference quantity. In accordance with the results of the determinations, the ECU 10 can determine whether the braking operation of the brake pedal 30 is intended to perform the emergency braking operation or the normal braking operation.

In the braking force control apparatus of FIG. 1, the speed and the quantity of the braking operation of the brake pedal 30 are detected by using the master cylinder pressure Pmc as the parameter to define the braking operation speed or the braking operation quantity. The master cylinder pressure Pmc is detected by the ECU 10 based on the signal supplied by the hydraulic pressure sensor 40. The master cylinder pressure Pmc varies in accordance with the braking operation speed or quantity, and a rate of change (dPmc) of the master cylinder pressure Pmc is in correspondence with the braking operation speed. Accordingly, before starting the brake-assist (BA) control, the braking force control apparatus of the present embodiment can determine, with accuracy, whether the braking operation of the brake pedal 30 is intended to perform the emergency braking operation or not. Hereinafter, this function of the braking force control apparatus of the present embodiment will be called a brake-assist control start judgment means. The ECU 10 acts as the brake-assist control start judgment means.

Alternatively, in the braking force control apparatus of the present invention, the brake-assist control start judgment means may be constituted by using another quantity of the braking operation of the brake pedal 30 other than the master cylinder pressure Pmc or the rate of change dPmc thereof described above with the present embodiment.

Next, a description will be given of the operation of the braking force control apparatus of the present embodiment after it is determined that the brake-assist (BA) control should be started. As described above, in the present embodiment, when the speed of the braking operation of the brake pedal 30 (or the rate of change dPmc of the master cylinder pressure) is above the given speed and the quantity of the braking operation of the brake pedal 30 (or the master cylinder pressure Pmc) is above the reference quantity, the ECU 10 determines that the braking operation of the brake pedal 30 is intended to perform the emergency braking operation.

When it is determined that the braking operation of the brake pedal 30 is intended to perform the emergency braking operation, the ECU 10 supplies the drive signals to the STR 26, the SA-1 46, the SA-2 48 and the SA-3 54.

When the drive signal is supplied to the STR 26 by the ECU 10, the STR 26 is set in the second position so that the STR 26 closes the controlled-pressure line 29 connected to the regulator 24, and connects the high-pressure line 22 to the third pressure line 42. The accumulator pressure Pace from the accumulator 20 is supplied to the third pressure line 42 through the STR 26. When the drive signal is supplied to the SA-1 46, the SA-1 46 is set in the second position so that the SA-1 46 connects the pressure adjustment line 56 to the wheel cylinder 44FR. The SA-1 46 closes off or disconnects the first pressure line 36 from the wheel cylinder 44FR. When the drive signal is supplied to the SA-2 48, the SA-2 48 is set in the second position so that the SA-2 48 connects the pressure adjustment line 62 to the wheel cylinder 44FL. The SA-2 48 closes off or disconnects the first pressure line 36 from the wheel cylinder 44FL. When the drive signal is supplied to the SA-3 54, the SA-3 54 is set in the second position so that the SA-3 54 connects the third pressure line 42 to the SRRH 68 and the SRLH 70. The SA-3 54 closes off or disconnects the second pressure line 38 from the SRRH 68 and the SRLH 70.

Hence, when the drive signals are supplied to the STR 26, the SA-1 46, the SA-2 48 and the SA-3 54, all the wheel cylinders 44 are connected to both the pressure-holding solenoids SH and the pressure-reducing solenoids SR, and the accumulator pressure Pacc is supplied to the upstream sides of the pressure-holding solenoids SH through the STR 26.

Immediately when it is determined that the braking operation of the brake pedal 30 is intended to perform the emergency braking operation, the ECU 10 does not yet supply the drive signals to the pressure-holding solenoids SH or the pressure-reducing solenoids SR. The accumulator pressure Pacc is supplied to the wheel cylinders 44 through the pressure-holding solenoids SH. Consequently, the wheel cylinder pressure Pwc of each of the wheel cylinders 44 is quickly increased toward the accumulator pressure Pacc.

Accordingly, it is possible for the braking force control apparatus of the present embodiment to quickly increase the wheel cylinder pressure Pwc of each of the wheel cylinders 44 when the emergency braking operation is performed, regardless of the magnitude of the braking operation force Fp. Therefore, in the braking force control apparatus of the present embodiment, after the condition requiring the emergency braking has occurred, it is possible to quickly generate an increased braking force larger than that generated during the normal control, even if the vehicle operator is a beginner.

After the accumulator pressure Pacc is continuously supplied to the wheel cylinders 44, the increased braking force is generated on the vehicle, and a relatively large slip ratio S of the vehicle wheels FR, FL, RR and RL is produced. It is then determined that the ABS control execution conditions are satisfied. After this determination is made, the execution of the ABS control of the braking force control apparatus of the present embodiment is started. As described above, the ECU 10 suitably performs one of (1) the pressure-increasing control mode, (2) the pressure-holding control mode and (3) the pressure-decreasing control mode so as to maintain the slip ratio S of each of the vehicle wheels FR, FL, RR and RL below the reference value, preventing all the vehicle wheels from being locked during the braking operation.

When the ABS control is performed following the emergency braking operation, the wheel cylinder pressure Pwc of each of the wheel cylinders 44 is increased by the supply of the accumulator pressure Pacc from the pump 12 or the accumulator 20 to the wheel cylinders 44, while the wheel cylinder pressure Pwc is reduced by the returning flow of the brake fluid within the wheel cylinders 44 to the reservoir tank 16. It is possible to prevent the malfunctioning of the master cylinder 32 even when the repeated execution of the pressure-increasing mode control and the pressure-reducing mode control is performed during the ABS control.

When the vehicle operator starts releasing the brake pedal 30 after the brake-assist (BA) control was started by the emergency braking operation, it is necessary to terminate the brake-assist (BA) control. In the braking force control apparatus of the present embodiment, during the execution of the brake-assist (BA) control, the ECU 10 supplies the drive signals to the STR 26, the SA-1 46, the SA-2 48 and the SA-3 54. When the drive signals are supplied to the solenoids 26, 46, 48, and 54 by the ECU 10, the solenoids 26, 46, 48 and 54 are set in the second positions as described above. In this condition, the internal pressure chamber of the regulator 24 is isolated from the wheel cylinders 44 and the pump 12, and both the first pressure chamber 32a and the second pressure chamber 32b of the master cylinder 32 are isolated from the wheel cylinders 44 and the pump 12.

Hence, in the braking force control apparatus of the present embodiment, during the execution of the brake-assist (BA) control, the master cylinder pressure Pmc varies in proportion with the braking operation force Fp on the brake pedal 30. By monitoring the master cylinder pressure Pmc which is detected based on the signal supplied by the hydraulic pressure sensor 40, the ECU 10 can easily determine whether a brake releasing operation of the brake pedal 30 is performed by the vehicle operator. When it is determined that the brake releasing operation is performed, the ECU 10 stops supplying the drive signals to the STR 26, the SA-1 46, the SA-2 48 and the SA-3 54. Hence, the brake-assist (BA) control is terminated and the normal control is restarted.

A deceleration that the vehicle occupant senses when quickly increasing the braking force acting on the vehicle after the start of the brake-assist (BA) control will increase as the vehicle speed becomes low. Herein-after, this deceleration will be called the sensed deceleration. If a rate of increase of the braking force as a result of the execution of the brake-assist (BA) control when the vehicle is running at a low speed is the same as that when the vehicle is running at a high speed, the ride comfort as a result of the execution of the brake-assist (BA) control during the low-speed running is likely to be significantly degraded. On the other hand, if the rate of increase of the braking force during the low-speed running is made lower than that during the high-speed running, after an emergency braking operation is performed, it is possible to appropriately exert an adequate braking force on the vehicle against the condition requiring the emergency braking during the low-speed running.

In the braking force control apparatus of the present embodiment, the rate of increase of the braking force accompanied by the start of the brake-assist (BA) control is changed in accordance with the vehicle speed. Specifically, the braking force control apparatus is adapted to lower the rate of increase of the braking force accompanied by the start of the brake-assist (BA) control as the vehicle speed at that time is decreased. According to the braking force control apparatus of the present embodiment, it is possible to prevent an unnecessarily large deceleration from being produced by the brake-assist (BA) control during the low-speed running of the vehicle.

Next, a description will be given of a control procedure performed by the ECU 10 of the braking force control apparatus in order to achieve the above-mentioned function of changing a rate of increase of the braking force in response to a vehicle speed, with reference to FIG. 3 through FIG. 5.

Figure 3:
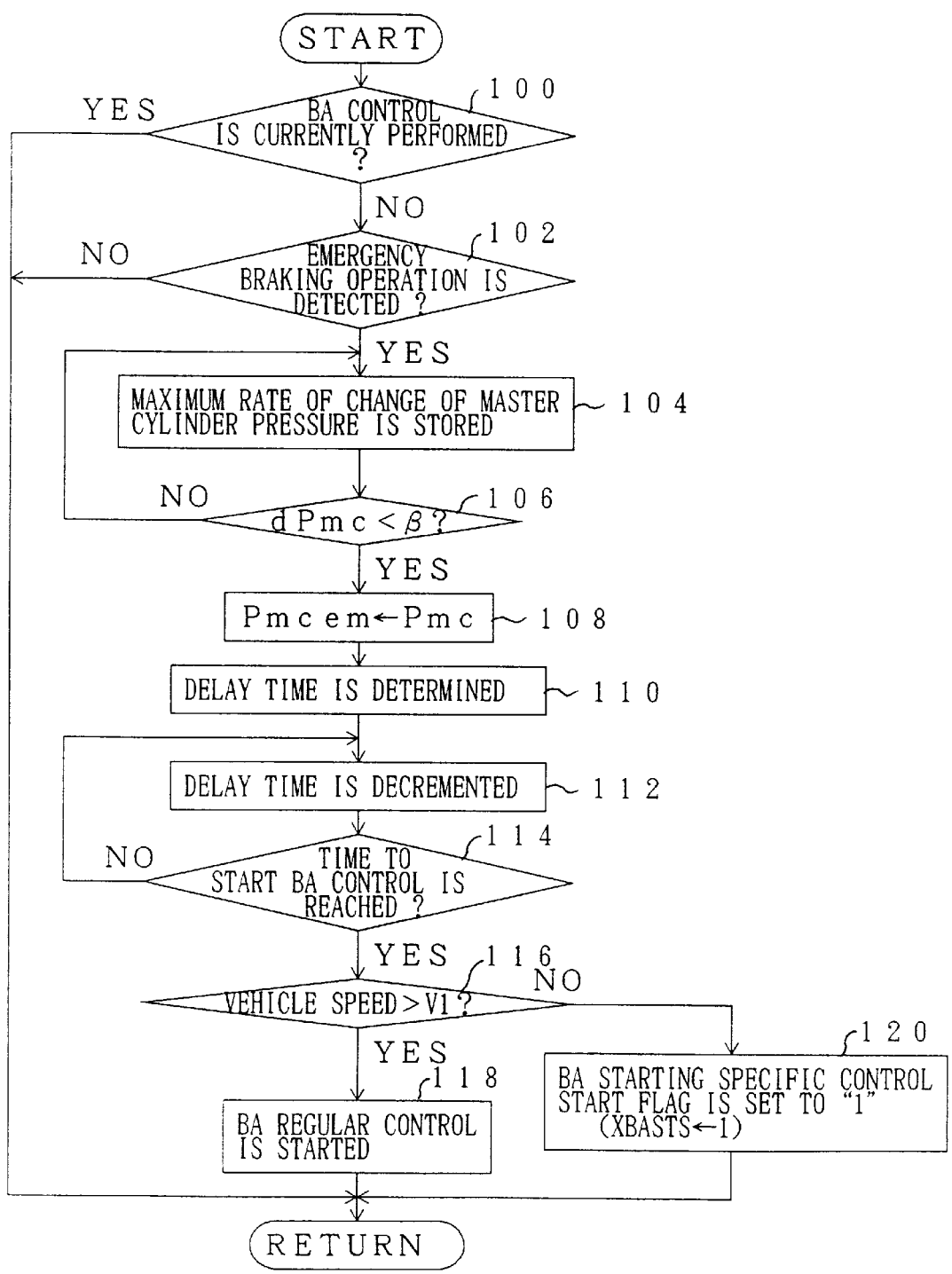
FIG. 3 is a flowchart for explaining a brake-assist execution condition judgment procedure performed by the braking force control apparatus of FIG. 1.

FIG. 3 is a flowchart for explaining a brake-assist execution condition judgment procedure performed by the ECU 10 of the braking force control apparatus of FIG. 1. The procedure of FIG. 3 is started every time a braking operation of the brake pedal 30 is performed. At the start of the brake-assist execution condition judgment procedure, the ECU 10 performs step 100 of the procedure of FIG. 3. When this procedure is performed for the first time after the detection of the braking operation of the brake pedal 30, all settings of flags used in this procedure and values of parameters temporarily stored in this procedure are initialized.

Step 100 determines whether the brake-assist (BA) control is currently performed. As the procedure of FIG. 3 is performed to make a determination as to whether the brake-assist (BA) control execution conditions are satisfied by the braking operation, the execution of the procedure of FIG. 3 is useless if the BA control is already being performed. When the result at the step 100 is affirmative (the BA control is currently performed), the procedure of FIG. 3 at the present cycle ends, and the subsequent steps of the procedure of FIG. 3 are not performed. On the other hand, when the result at the step 100 is negative (the BA control is not currently performed), the ECU 10 performs a next step 102 of the procedure of FIG. 3.

Step 102 determines whether an emergency braking operation of the brake pedal 30 is detected. In the step 102, after the ON signal output by the brake switch 84 is detected, the ECU 10 determines whether both a master cylinder pressure Pmc that is above the reference pressure and a master cylinder pressure change rate dPmc that is above a reference change rate are detected based on the signal supplied by the hydraulic pressure sensor 40. When the result at the step 102 is negative (the emergency braking operation is not detected), the procedure of FIG. 3 at the present cycle ends, and the subsequent steps of the procedure of FIG. 3 are not performed. On the other hand, when the result at the step 102 is affirmative (the emergency braking operation is detected), the ECU 10 performs a next step 104 of the procedure of FIG. 3.

Step 104 stores a maximum rate of change (MAXdPmc) of the master cylinder pressure Pmc in a memory of the ECU 10. In the step 104, when a presently-detected master cylinder pressure change rate dPmc is larger than a maximum rate of change (MAXdPmc) of the master cylinder pressure Pmc previously stored in the memory of the ECU 10, the previous maximum change rate MAXdPmc is renewed by the presently-detected master cylinder pressure change rate dPmc, and the new maximum change rate is stored in the memory of the ECU 10 at the present cycle. When the presently-detected master cylinder pressure change rate dPmc is not larger than the previously-stored maximum change rate MAXdPmc, the renewal of the maximum change rate MAXdPmc is not performed, and the previously-stored maximum rate of change MAXdPmc is stored in the memory of the ECU 10 without change. After the step 104 is performed, the ECU 10 performs a next step 106 of the procedure of FIG. 3.

Step 106 determines whether the master cylinder pressure change rate dPmc is smaller than a predetermined reference value $\beta$. The reference value $\beta$ is a threshold value that is used to make a determination as to whether a rate of increase of the master cylinder pressure Pmc during the emergency braking operation has changed to a low rate. When the result at the step 106 is negative (dPmc$\geq\beta$), it is determined that the rate of increase of the master cylinder pressure Pmc is being rapidly increased. In this case, the control is transferred back to the step 104, and the ECU 10 performs the step 104 again. On the other hand, when the result at the step 106 is affirmative (dPmc<$\beta$), it is determined that the rate of increase of the master cylinder pressure Pmc has changed to the low rate. In this case, the ECU 10 performs a next step 108 of the procedure of FIG. 3. After the steps 104 and 106 are performed, the maximum change rate MAXdPmc of the master cylinder pressure Pmc, produced during the emergency braking operation between the time the depression of the brake pedal 30 was started and the time the rate of increase of the master cylinder pressure Pmc has changed to the low rate, is stored in the memory of the ECU 10.

The above-mentioned condition of the step 106 is satisfied when the rate of increase of the master cylinder pressure Pmc has changed to the low rate after the master cylinder pressure Pmc was quickly increased by the emergency braking operation. Hence, when the result at the step 106 is affirmative, an adequately high master cylinder pressure Pmc is already produced in the master cylinder 32.

Generally, in the braking force control apparatus of the present embodiment, there is a delay time between the time the master cylinder pressure Pmc was increased to the adequately high level and the time the wheel cylinder pressure Pwc is increased to an adequately high level. For this reason, when the condition of the step 106 has just been satisfied, there is a difference between the master cylinder pressure Pmc and the wheel cylinder pressure Pwc.

Hereinafter, this pressure difference will be called the emergency braking pressure difference dPem. When the emergency braking pressure difference dPem is at a large level, the master cylinder pressure Pmc from the master cylinder 32 is continuously supplied to the wheel cylinders 44 until the difference |Pmc−Pmc| is reduced to a certain level. The wheel cylinder pressure Pwc can be more smoothly increased to the adequately high level by this method, rather than using the accumulator pressure Pacc from the accumulator 20 or the pump 12 being supplied to the wheel cylinders 44. Therefore, in the present embodiment, after an estimated delay time elapses since the time the condition of the step 106 is satisfied, the execution of the brake-assist (BA) control is started.

The time required to increase the wheel cylinder pressure Pwc to the adequately high level by supplying the master cylinder pressure Pmc to the wheel cylinders 44 will increase as the emergency braking pressure difference dPem becomes high. The emergency braking pressure difference dPem will increase as the master cylinder pressure Pmc at the time the condition of the step 106 has just been satisfied (hereinafter, this master cylinder pressure will be called the emergency braking master cylinder pressure Pmcem) becomes high. Further, the emergency braking pressure difference dPem will increase as the maximum change rate MAXdPmc of the master cylinder pressure Pmc produced during the emergency braking operation from the time the depression of the brake pedal 30 was started to the time the rate of increase of the master cylinder pressure Pmc has changed to the low rate (which maximum change rate is stored in the step 104) becomes high. Hence, in the present embodiment, the delay time is determined in the following steps 108 and 110 based on the emergency braking master cylinder pressure Pmcem and the maximum change rate MAXdPmc.

Step 108 stores the master cylinder pressure Pmc, which is detected based on the signal supplied by the hydraulic pressure sensor 40 at the time the condition of the step 106 is satisfied, in the memory of the ECU 10 as the emergency braking master cylinder pressure Pmcem (Pmcem←Pmc). After the step 108 is performed, the ECU 10 performs a next step 110 of the procedure of FIG. 3.

Step 110 determines a delay time D based on the emergency braking master cylinder pressure Pmcem (stored in the step 108) and the maximum change rate MAXdPmc (stored in the step 104). The delay time D is determined by the ECU 10 by reading out a map, which is stored, in advance, in the memory of the ECU 10, in accordance with the emergency braking master cylinder pressure Pmcem and the maximum change rate MAXdPmc. Specifically, the delay time D will increase to a relatively long time (D1) as both the emergency braking master cylinder pressure Pmcem and the maximum change rate dPem are increased (or the emergency braking pressure difference dPem is increased). The delay time D will decrease to a relatively short time (Ds) as both the emergency braking master cylinder pressure Pmcem and the maximum change rate dPem are decreased (or the emergency braking pressure difference dPem is decreased).

After the step 110 is performed, the ECU 10 at step 112 decrements the delay time D (D←(D−1)). After the step 112 is performed, the ECU 10 at step 114 determines whether the time to start the execution of the brake-assist (BA) control is reached by detecting whether the decremented delay time D is equal to zero "0". When the result at the step 114 is negative, it is determined that the time to start the execution of the BA control is not yet reached. The control is transferred back to the step 112, and the ECU 10 performs the step 112 again. When the result at the step 114 is affirmative after the steps 112 and 114 are repeated, it is determined that the time to start the execution of the BA control is reached. In this case, the ECU 10 performs a next step 116 of the procedure of FIG. 3.

Step 116 determines whether a vehicle speed V (detected based on the signals supplied by the wheel speed sensors 86) is larger than a reference speed V1. The reference speed V1 is a threshold value that is predetermined according to the experiments of the inventors. When V>V1, it is determined that the vehicle is running at a high speed, and the sensed deceleration when quickly increasing the braking force acting on the vehicle after the start of the brake-assist (BA) control will not be so large as to degrade the ride comfort of the vehicle occupant. Therefore, when the result at the step 116 is affirmative (V>V1), the ECU 10 performs a next step 118 of the procedure of FIG. 3.

Step 118 starts the execution of the brake-assist (BA) control in the braking force control apparatus of the present embodiment in a regular manner. Hereinafter, the BA control which is started in the step 118 will be called the BA regular control. In the step 118, the ECU 10 supplies the respective drive signals to the STR 26, the SA-1 46, the SA-2 48 and the SA-3 54. The STR 26 is set in the second position so that the controlled-pressure line 29 from the regulator 24 is closed and the high-pressure line 22 from the accumulator 20 is opened by the STR 26. The SA-1 46 is set in the second position so that the SA-1 46 connects the pressure adjustment line 56 to the wheel cylinder 44FR. The SA-2 48 is set in the second position so that the SA-2 48 connects the pressure adjustment line 62 to the wheel cylinder 44FL. The SA-3 54 is set in the second position so that the SA-3 54 connects the third pressure line 42 to the SRRH 68 and the SRLH 70. Hence, after the execution of the BA regular control is started in the step 118, the wheel cylinder pressure Pwc of each of the wheel cylinders 44 will be quickly increased toward the accumulator pressure Pacc. After the step 118 is performed, the procedure of FIG. 3 at the present cycle ends.

On the other hand, when the result at the step 116 is negative (V≦V1), it is determined that the vehicle is running at a low speed, and the sensed deceleration when quickly increasing the braking force acting on the vehicle after the start of the brake-assist (BA) control will be large enough to degrade the ride comfort of the vehicle occupant. Therefore, when the result at the step 116 is negative (V≦V1), the ECU 10 performs a next step 120 of the procedure of FIG. 3.

Step 120 sets a BA starting specific control start flag (XBASTS) to "1" (XBASTS←"1"). The BA starting specific start flag XBASTS is set to "1" when starting the execution of a specifically-controlled brake-assist (BA) control in the braking force control apparatus of the present embodiment. Hereinafter, the specifically-controlled BA control, performed after the step 120 is performed, will be called the BA starting specific control. The BA starting specific start flag XBASTS is reset to "0" when the ABS control execution conditions are satisfied during the BA control or when the execution of the BA control is terminated. When the step 120 is performed, the procedure of FIG. 3 at the present cycle ends.

Figure 4:
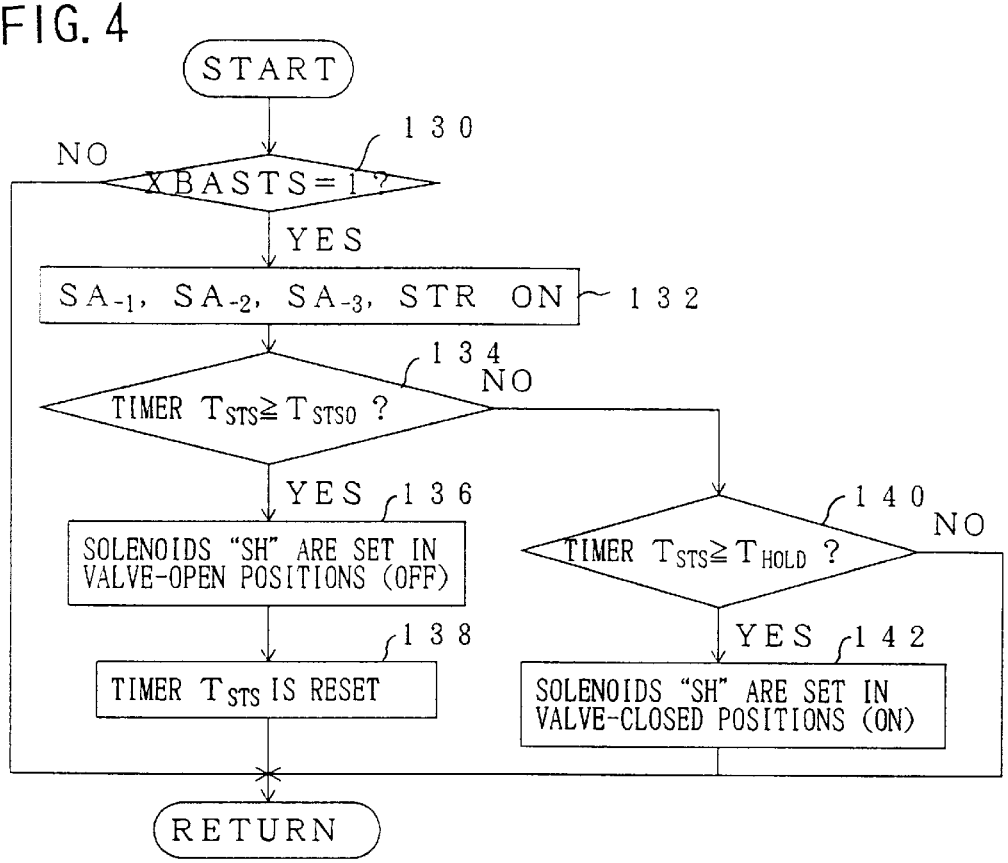
FIG. 4 is a flowchart for explaining a brake-assist starting specific control procedure performed by the braking force control apparatus of FIG. 1.

FIG. 4 is a flowchart for explaining a brake-assist (BA) starting specific control procedure performed by the ECU 10 of the braking force control apparatus of FIG. 1. The first embodiment of the present invention is constituted by the ECU 10 of the braking force control apparatus of FIG. 1 when performing the control procedures of FIG. 3 and FIG. 4.

The BA starting specific control is performed in the braking force control apparatus of the present embodiment in order to lower in an appropriate manner the rate of increase of the braking force accompanied by the start of the BA control. The BA starting specific control is achieved by the ECU 10 when performing a brake-assist (BA) starting specific control procedure shown in FIG. 4. The control procedure shown in FIG. 4 is an interrupt-initiated routine which is periodically initiated at intervals of a predetermined time. As shown in FIG. 4, at the start of the BA starting specific control procedure, the ECU 10 of the braking force control apparatus of the present embodiment performs step 130 of the procedure of FIG. 4.

Step 130 determines whether the BA starting specific start flag XBASTS is equal to 1. When the result at the step 130 is negative (the flag XBASTS is not equal to 1), the procedure of FIG. 4 at the present cycle ends, and the subsequent steps of the procedure of FIG. 4 are not performed. When the result at the step 130 is affirmative (XBASTS=1), the ECU 10 performs a next step 132 of the procedure of FIG. 4.

Step 132 supplies the respective drive signals to the STR 26, the SA-1 46, the SA-2 48 and the SA-3 54. After the step 132 is performed, the brake fluid paths through which the accumulator pressure Pacc is supplied to each of the wheel cylinders 44 are opened by the STR 26, the SA-1 46, the SA-2 48 and the SA-3 54. After the step 132 is performed, the ECU 10 performs a next step 134 of the procedure of FIG. 4.

Step 134 determines whether a timer $T_{STS}$ is above a predetermined reference time $T_{STS0}$. During the operation of the ECU 10, the timer $T_{STS}$ is automatically incremented to a given upper limit that is larger than the reference time $T_{STS0}$. During the execution of the procedure of FIG. 4, the timer $T_{STS}$ is reset to zero at a given timing. Only when the step 134 is performed for the first time after the start of the procedure of FIG. 4, the timer $T_{STS}$ is set to the upper limit, and the result at the step 134 is affirmative ($T_{STS} \geq T_{STS0}$). When the result at the step 134 is affirmative, the ECU 10 performs a next step 136 of the procedure of FIG. 4.

Step 136 sets all the pressure-holding solenoids SH in the valve-open positions (or the OFF states with no drive signal supplied to the pressure-holding solenoids SH). The pressure-holding solenoids SH open the pressure adjustment lines 56, 62, 72 and 78, and the accumulator pressure Pacc is supplied to each of the wheel cylinders 44 so that the wheel cylinder pressure Pwc of each of the wheel cylinders 44 will be quickly increased. After the step 136 is performed, the ECU 10 performs a next step 138 of the procedure of FIG. 4.

Step 138 resets the timer $T_{STS}$ to zero. After the step 138 is performed, the procedure of FIG. 4 at the present cycle ends. After the timer $T_{STS}$ is reset to zero, the timer $T_{STS}$ is automatically incremented from zero to the upper limit. In the subsequent cycles, the result at the step 134 will be negative ($T_{STS} < T_{STS0}$) until the reference time $T_{STS0}$ elapses. When the result at the step 134 is negative, the ECU 10 performs a next step 140 of the procedure of FIG. 4.

Step 140 determines whether the timer $T_{STS}$ is above a given hold time $T_{HOLD}$. The hold time $T_{HOLD}$ is predetermined to be smaller than the reference time $T_{STS0}$ ($T_{HOLD} < T_{STS0}$). When the result at the step 140 is negative ($T_{STS} < T_{HOLD}$), it is determined that the hold time $T_{HOLD}$ has not yet elapsed after the timer $T_{STS}$ is reset to zero. In this case, the procedure of FIG. 4 at the present cycle ends, and the subsequent step is not performed. On the other hand, when the result at the step 140 is affirmative ($T_{STS} \geq T_{HOLD}$), it is determined that the hold time $T_{STS}$ elapses after the timer $T_{STS}$ is reset to zero. In this case, the ECU 10 performs a next step 142 of the procedure of FIG. 4.

Step 142 sets all the pressure-holding solenoids SH in the valve-closed positions (or the ON states with the respective drive signal being supplied to the pressure-holding solenoids SH). The pressure-holding solenoids SH close the pressure adjustment lines 56, 62, 72 and 78, and all the wheel cylinders 44 are isolated from the STR 26. The supply of the accumulator pressure Pacc to each of the wheel cylinders 44 is stopped, and the wheel cylinder pressure Pwc of each of the wheel cylinders 44 is held at the same level without being increased.

After the step 142 is performed, the procedure of FIG. 4 at the present cycle ends. In the subsequent cycles the result at the step 140 will be affirmative ($T_{STS} \geq T_{HOLD}$) until the reference time $T_{STS0}$ elapses. The step 142 is continuously performed for such a duration so that the wheel cylinder pressure Pwc is held at the same level. Further, when the timer $T_{STS}$ is incremented to exceed the reference time $T_{STS0}$, the result at the step 134 will be affirmative. At that time, the step 136 is performed again so that all the pressure-holding solenoids SH are set in the valve-open positions, and the wheel cylinder pressure Pwc of each of the wheel cylinders 44 will be quickly increased toward the accumulator pressure Pacc.

In the above-described procedure of FIG. 4, after the flag XBASTS is set to 1, the wheel cylinder pressure Pwc is continuously increased toward the accumulator pressure Pacc until the hold time $T_{HOLD}$ elapses after the timer $T_{STS}$ is reset to zero. When the hold time $T_{HOLD}$ passed but the reference time $T_{STS0}$ has not yet elapsed, the supply of the accumulator pressure Pacc to each of the wheel cylinders 44 is stopped and the wheel cylinder pressure Pwc is held at the same level by the pressure-holding solenoids SH. In this manner, the pressure increasing operation of the wheel cylinders 44 and the pressure holding operation of the wheel cylinders 44 are repeated every time the reference time $T_{STS}$ elapses after the timer $T_{STS}$ is reset to zero. Therefore, by performing the BA starting specific control procedure of FIG. 4, it is possible for the braking force control apparatus of the present embodiment to lower in an appropriate manner the rate of increase of the braking force accompanied by the start of the BA starting specific control, in comparison with the rate of increase of the braking force accompanied by the start of the BA regular control.

Figure 5:
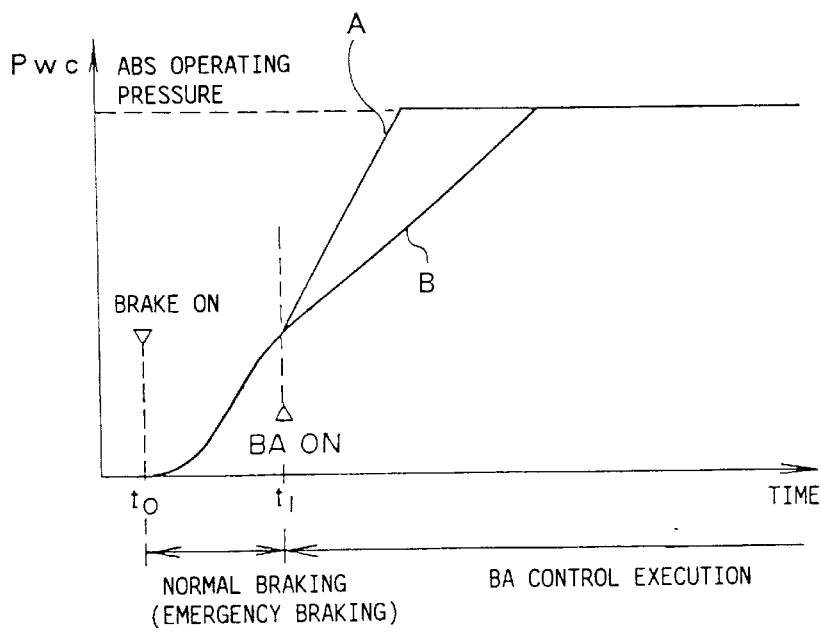
FIG. 5 is a time chart for explaining changes of a wheel cylinder pressure with respect to the elapsed time in the braking force control apparatus of FIG. 1.

FIG. 5 is a time chart for explaining changes of a wheel cylinder pressure Pwc with respect to the elapsed time in the braking force control apparatus of FIG. 1. In FIG. 5, an emergency braking operation of the brake pedal 30 is started at a time "t0". The curve "A", shown in FIG. 5, indicates an increasing characteristic of the wheel cylinder pressure Pwc produced when the execution of the brake-assist (BA) regular control is started at a time "t1" following the time "t0" the emergency braking operation is started. The braking force control apparatus of the present embodiment achieves the increasing characteristic of the wheel cylinder pressure Pwc indicated by the curve A, when the vehicle is running at a high speed above the reference speed V1 and the emergency braking operation is performed. It is possible for the braking force control apparatus of the present embodiment to quickly generate a large braking force after the start of the brake-assist control.

The curve "B", shown in FIG. 5, indicates an increasing characteristic of the wheel cylinder pressure Pwc produced when the execution of the brake-assist (BA) starting specific control is started at the time "t1" following the time "t0" the emergency braking operation is started. The braking force control apparatus of the present embodiment achieves the increasing characteristic of the wheel cylinder pressure Pwc indicated by the curve B, when the vehicle is running at a low speed below the reference speed V1 and the emergency braking operation is performed. It is possible for the braking force control apparatus of the present embodiment to lower in an appropriate manner the rate of increase of the braking force accompanied by the start of the BA starting specific control, in comparison with the rate of increase of the braking force accompanied by the start of the BA regular control. It is possible to prevent an unnecessarily large deceleration from being produced by the BA control during the low-speed running of the vehicle.

As described above, the braking force control apparatus of the present embodiment can quickly increase the wheel cylinder pressure Pwc toward the accumulator pressure Pacc when an emergency braking operation is performed during a high-speed running of the vehicle. Further, when an emergency braking operation is performed during a low-speed running of the vehicle, the braking force control apparatus of the present embodiment can increase the wheel cylinder pressure Pwc at a lowered rate of increase while preventing an unnecessarily large deceleration from being produced by the BA control. Therefore, the braking force control apparatus of the present embodiment is effective in achieving the functions of the BA control in an appropriate manner for all the ranges of the vehicle speed V without degrading the ride comfort of the vehicle occupant.

In the above-described embodiment, the determination as to whether the emergency braking operation of the brake pedal by the vehicle operator is an intentional operation is made based on the master cylinder pressure Pmc and the master cylinder pressure change rate dPmc. However, the basic parameter for making the determination according to the present invention is not limited to the master cylinder pressure Pmc and the master cylinder pressure change rate dPmc.

When the braking operation of the brake pedal 30 is performed, not only the master cylinder pressure Pmc, but also the braking operation force Fp on the brake pedal 30 or a stroke L of the brake pedal 30 varies in accordance with a quantity of the braking operation. Further, when the braking force is exerted on the vehicle as a result of the braking operation of the brake pedal 30, a deceleration G of the vehicle is produced. By taking account of these factors, the determination as to whether the braking operation is an emergency braking operation or a normal braking operation, and the determination as to whether the braking operation is an intentional operation may be made based on any of the basic parameters including: (1) the master cylinder pressure Pmc; (2) the braking operation force Fp; (3) the brake pedal stroke L; (4) the vehicle deceleration G; (5) the estimated vehicle speed Vso; and (6) the wheel speed Vw.

Next, a description will be given of the second embodiment of the present invention, with reference to FIG. 6 and FIG. 7. The second embodiment of the present invention is constituted by the ECU 10 of the braking force control apparatus of FIG. 1 when performing the control procedures of FIG. 6 and FIG. 7.

Figure 6:
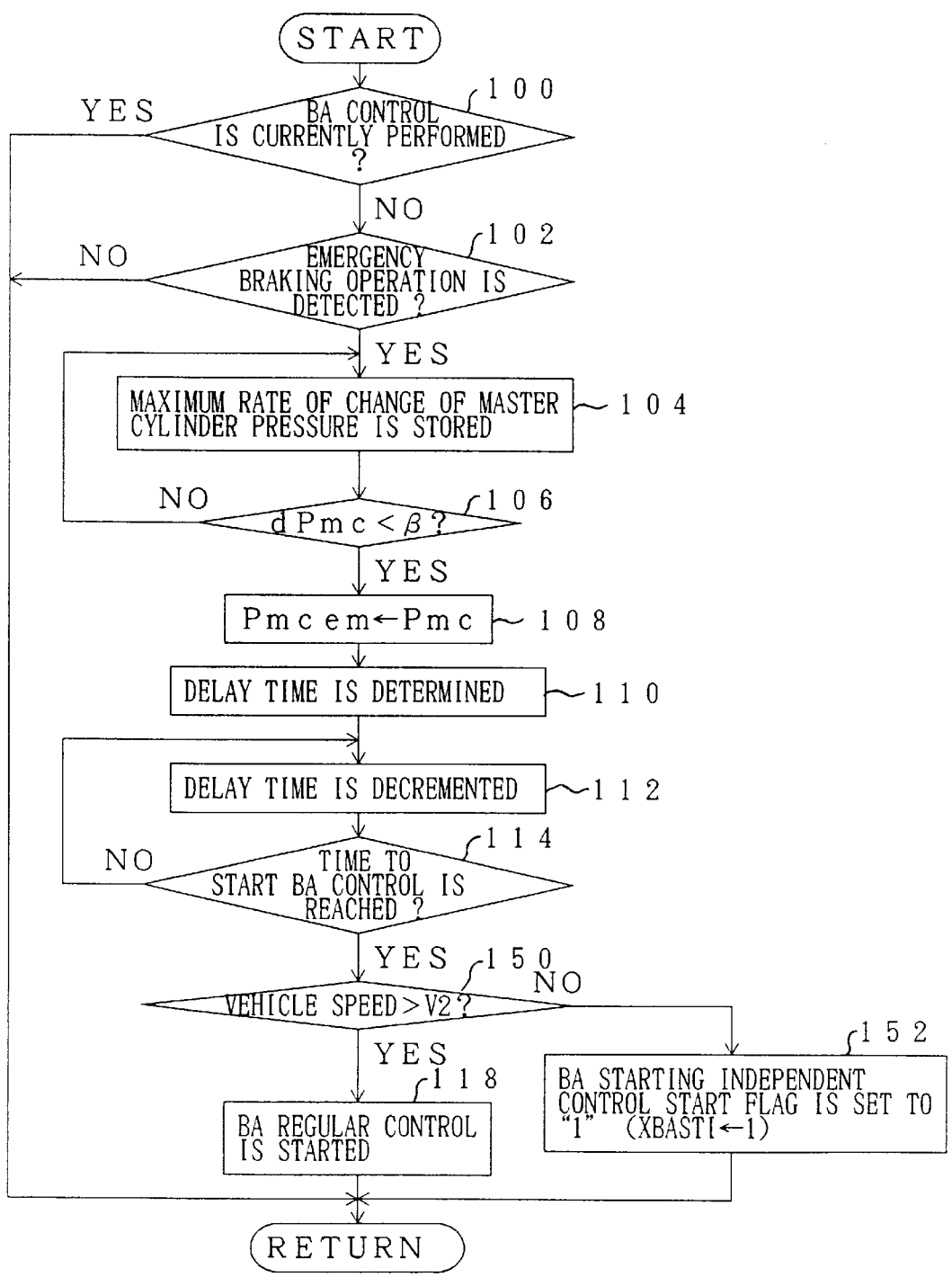
FIG. 6 is a flowchart for explaining another brake-assist execution condition judgment procedure performed by the braking force control apparatus of FIG. 1.

FIG. 6 is a flowchart for explaining another brake-assist execution condition judgment procedure performed by the ECU 10 of the braking force control apparatus of the present embodiment. Similar to the procedure of FIG. 3, the procedure of FIG. 6 is started every time a braking operation of the brake pedal 30 is performed. When this procedure is performed for the first time after the detection of the braking operation of the brake pedal 30, all settings of flags used in this procedure and values of parameters temporarily stored in this procedure are initialized. In FIG. 6, the steps which are the same as corresponding steps in FIG. 3 are designated by the same reference numerals, and a description thereof will be omitted.

In the procedure of FIG. 6, the steps 100 through 114 are performed in order to determine whether the brake-assist (BA) control execution conditions are satisfied, and to determine whether the time to start the execution of the brake-assist (BA) control is reached, similar to the corresponding steps in the procedure of FIG. 3. When the result at the step 114 is affirmative (the time to start the execution of the BA control is reached), the ECU 10 performs a next step 150 of the procedure.

Step 150 determines whether a vehicle speed V (detected based on the signals supplied by the wheel speed sensors 86) is larger than a predetermined reference speed V2. The reference speed V2 is a threshold value that is predetermined according to the experiments of the inventors. The reference speed V2 in the present embodiment is used to make a determination as to whether the wheel cylinder pressure Pwc after the start of the BA control should be increased at a normal rate of increase or at a lower rate of increase.

When V>V2, it is determined that the vehicle is running at a high speed, and the sensed deceleration when quickly increasing the braking force acting on the vehicle after the start of the BA control will not be so large as to degrade the ride comfort of the vehicle occupant. Therefore, when the result at the step 150 is affirmative (V>V2), the ECU 10 performs the step 118 which is the same as the step 118 of the procedure of FIG. 3. After the execution of the BA regular control is started in the step 118, the wheel cylinder pressure Pwc of each of the wheel cylinders 44 will be quickly increased toward the accumulator pressure Pacc. After the step 118 is performed, the procedure of FIG. 6 at the present cycle ends.

On the other hand, when the result at the step 150 is negative (V≦V2), it is determined that the vehicle is running at a low speed and the sensed deceleration when quickly increasing the braking force acting on the vehicle after the start of the brake-assist (BA) control will be large enough to degrade the ride comfort of the vehicle occupant. Therefore, when the result at the step 150 is negative (V≦V2), the ECU 10 performs a next step 152 of the procedure of FIG. 6.

Step 152 sets a BA starting independent control start flag (XBASTI) to "1" (XBASTI←"1"). The BA starting independent control start flag XBASTI is set to "1" when starting the execution of an independently-controlled brake-assist (BA) control in the braking force control apparatus of the present embodiment. Hereinafter, the independently-controlled BA control, subsequently performed after the step 152 is performed, will be called the BA starting independent control. The BA starting independent control start flag XBASTI is reset to "0" when the ABS control execution conditions are satisfied during the BA control or when the execution of the BA control is terminated. After the step 152 is performed, the procedure of FIG. 6 at the present cycle ends.

Figure 7:
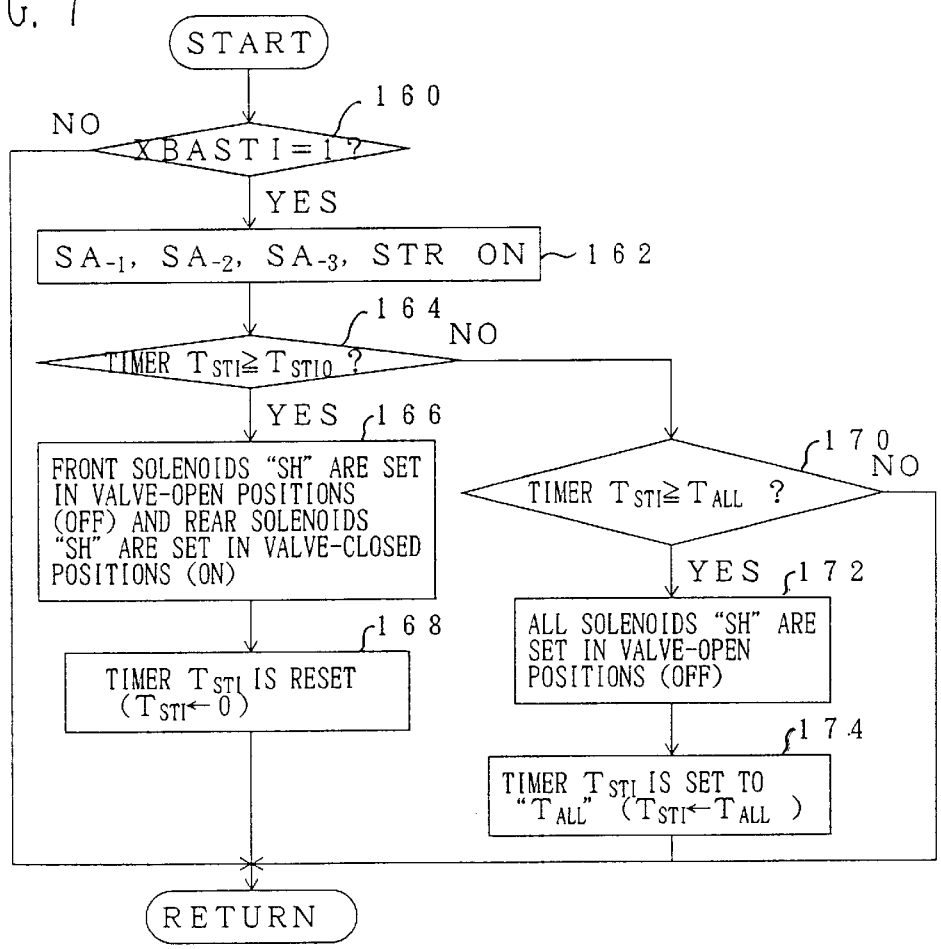
FIG. 7 is a flowchart for explaining a brake-assist starting independent control procedure performed by the braking force control apparatus of FIG. 1.

FIG. 7 is a flowchart for explaining a brake-assist (BA) starting independent control procedure performed by the ECU 10 of the braking force control apparatus of FIG. 1.

The BA starting independent control is performed by the ECU 10 wherein the time the braking force on the rear wheels RR and RL is increased by the start of the BA control is delayed from the time the braking force on the front wheels FR and FL is increased by the start of the BA control, in order to lower in an appropriate manner the rate of increase of the braking force accompanied by the start of the BA control. The BA starting independent control is achieved by the ECU 10 when performing a brake-assist (BA) starting independent control procedure shown in FIG. 7. The control procedure shown in FIG. 7 is an interrupt-initiated routine which is periodically initiated at intervals of a predetermined time. As shown in FIG. 7, at the start of the BA starting independent control procedure, the ECU 10 performs step 160 of the procedure of FIG. 7.

Step 160 determines whether the BA starting independent control start flag XBASTI is equal to 1. When the result at the step 160 is negative (the flag XBASTI is not equal to 1), the procedure of FIG. 7 at the present cycle ends, and the subsequent steps of the procedure of FIG. 7 are not performed. When the result at the step 160 is affirmative (XBASTI=1), the ECU 10 performs a next step 162 of the procedure of FIG. 7.

Step 162 supplies the respective drive signals to the STR 26, the SA-1 46, the SA-2 48 and the SA-3 54. After the step 162 is performed, the brake fluid paths through which the accumulator pressure Pacc is supplied to each of the wheel cylinders 44 are opened by the STR 26, the SA-1 46, the SA-2 48 and the SA-3 54. After the step 162 is performed, the ECU 10 performs a next step 164 of the procedure of FIG. 7.

Step 164 determines whether a timer $T_{STI}$ is above a predetermined reference time $T_{STIO}$. During the operation of the ECU 10, the timer $T_{STI}$ is automatically incremented to a given upper limit that is larger than the reference time $T_{STIO}$. During the execution of the procedure of FIG. 7, the timer $T_{STI}$ is reset to zero at a controlled timing. Only when the step 164 is performed for the first time after the start of the procedure of FIG. 7, the timer $T_{STI}$ is set to the upper limit, and the result at the step 164 is affirmative ($T_{STI} \geq T_{STIO}$). When the result at the step 164 is affirmative, the ECU 10 performs a next step 166 of the procedure of FIG. 7.

Step 166 sets the front-right and front-left pressure-holding solenoids SFRH 50 and SFLH 52 in the valve-open positions (or the OFF states with no drive signal supplied to the solenoids 50 and 52), and sets the rear-right and rear-left pressure-holding solenoids SRRH 68 and SRLH 70 in the valve-closed positions by supplying the drive signals to the solenoids 68 and 70 (or the ON states). Only the front-wheel-related pressure-holding solenoids 50 and 52 open the pressure adjustment lines 56 and 62, and the accumulator pressure Pacc is supplied to each of the front wheel cylinders 44FR and 44FL so that the wheel cylinder pressure Pwc of each of the front wheel cylinders 44FR and 44FL will be quickly increased. However, the wheel cylinder pressure Pwc of each of the rear wheel cylinders 44RR and 44RL is maintained at the same level by the rear-wheel-related pressure-holding solenoids 68 and 70. After the step 166 is performed, the ECU 10 performs a next step 168 of the procedure of FIG. 7.

Step 168 resets the timer $T_{STI}$ to zero. After the step 168 is performed, the procedure of FIG. 7 at the present cycle ends. After the timer $T_{STI}$ is reset to zero, the timer $T_{STI}$ is automatically incremented from zero to the upper limit. In the subsequent cycles, the result at the step 164 will be negative ($T_{STI} < T_{STIO}$) until the reference time $T_{STIO}$ elapses. When the result at the step 164 is negative, the ECU 10 performs a next step 170 of the procedure of FIG. 7.

Figure 8:
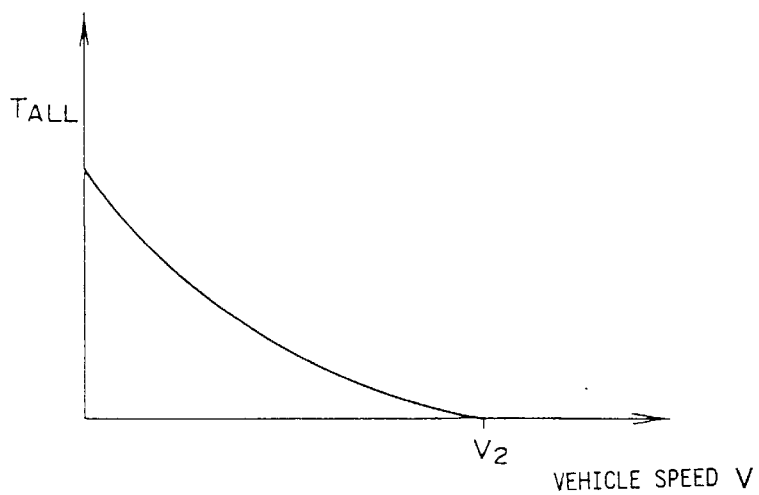
FIG. 8 is a diagram showing a map read by the braking force control apparatus during the brake-assist starting independent control procedure of FIG. 7.

Step 170 determines whether the timer $T_{STI}$ is above a delay time $T_{ALL}$. The delay time $T_{ALL}$ is predetermined to be smaller than the reference time $T_{STIO}$ ($T_{ALL} < T_{STIO}$). In the present embodiment, the delay time $T_{ALL}$ defines a period during which the increasing of the wheel cylinder pressure Pwc of each of the rear wheel cylinders 44RR and 44RL after the start of the BA control, is inhibited. The ECU 10 determines a delay time $T_{ALL}$ based on the vehicle speed V by reading a map from the memory of the ECU 10. In this map, as shown in FIG. 8, the delay time $T_{ALL}$ will decrease as the vehicle speed V becomes high. The lower the vehicle speed V, the larger the delay time $T_{ALL}$. In FIG. 8, "V2" indicates a reference speed of the vehicle speed V, which corresponds to the threshold value used in the procedure of FIG. 6.

When the result at the step 170 is negative ($T_{STI} < T_{ALL}$), it is determined that the delay time $T_{ALL}$ has not yet elapsed after the timer $T_{STI}$ is reset to zero. In this case, the procedure of FIG. 7 at the present cycle ends, and the subsequent steps are not performed. Hence, before the delay time $T_{ALL}$ elapses after the timer $T_{STI}$ is reset to zero, the solenoids 50 and 52 are set in the valve-open positions so as to allow the increasing of the wheel cylinder pressure Pwc of each of the front wheel cylinders 44FR and 44FL, and the solenoids 68 and 70 are set in the valve-closed positions so as to maintain the wheel cylinder pressure Pwc of each of the rear wheel cylinders 44RR and 44RL at the same level. On the other hand, when the result at the step 170 is affirmative ($T_{STI} \geq T_{ALL}$), it is determined that the delay time $T_{STI}$ elapses after the timer $T_{STI}$ is reset to zero. In this case, the ECU 10 performs a next step 172 of the procedure of FIG. 7.

Step 172 sets all the pressure-holding solenoids SH in the valve-open positions (or the OFF states with no drive signal being supplied to the pressure-holding solenoids SH). The pressure-holding solenoids SH open the pressure adjustment lines 56, 62, 72 and 78, and the supply of the accumulator pressure Pace to each of the wheel cylinders 44 is allowed, and the wheel cylinder pressure Pwc of each of the wheel cylinders 44 is quickly increased toward the accumulator pressure Pacc. After the step 172 is performed, the ECU 10 performs a next step 174 of the procedure of FIG. 7.

Step 174 sets the timer $T_{STI}$ to the delay time $T_{ALL}$ ($T_{STI} \leftarrow T_{ALL}$). After the step 174 is performed, the procedure of FIG. 7 at the present cycle ends. The timer $T_{ALL}$ is automatically incremented after the step 174 is performed. In the subsequent cycles the result at the step 170 will be affirmative ($T_{STI} \geq T_{ALL}$) until the flag XBASTI is reset to zero. The steps 160–164 and the steps 170–174 are continuously repeated for such a duration so that the wheel cylinder pressure Pwc is quickly increased toward the accumulator pressure Pacc.

In the above-described procedure of FIG. 7, after the flag XBASTI is set to 1, only the wheel cylinder pressure Pwc of each of the front wheel cylinders 44FR and 44FL is increased toward the accumulator pressure Pacc until the delay time $T_{ALL}$ elapses after the timer $T_{STI}$ is reset to zero. When the delay time $T_{ALL}$ passed but the flag XBASTI is not reset to zero, the supply of the accumulator pressure Pacc to all the wheel cylinders 44 is allowed by the pressure-holding solenoids SH and the wheel cylinder pressure Pwc of each of the wheel cylinders 44 is quickly increased toward the accumulator pressure Pacc by the pressure-holding solenoids SH. In this manner, the time to start increasing the braking force on the rear wheels RR and RL after the start of the BA control is delayed from the time to start increasing the braking force on the front wheels FR and FL after the start of the BA control. Therefore, by performing the BA starting independent control procedure of FIG. 7, it is possible for the braking force control apparatus of the present embodiment to lower in an appropriate manner the rate of increase of the entire braking force accompanied by the start of the BA starting independent control, in comparison with the rate of increase of the braking force accompanied by the start of the BA regular control.

As described above, the braking force control apparatus of the present embodiment can increase the wheel cylinder pressure Pwc toward the accumulator pressure Pacc at a lowered rate of increase when an emergency braking operation is performed during a low-speed running of the vehicle. As shown in FIG. 8, the delay time $T_{ALL}$ between the time to start increasing the braking force on the rear wheels RR and RL after the start of the BA control and the time to start increasing the braking force on the front wheels FR and FL after the start of the BA control will increase as the vehicle speed V becomes low. Therefore, the braking force control apparatus of the present embodiment is effective in achieving the functions of the BA control for all the ranges of the vehicle speed V without degrading the ride comfort of the vehicle occupant.

In the above-described embodiment, by performing the BA starting independent control procedure of FIG. 7 when an emergency braking operation is detected, the braking force control apparatus generates a relatively large braking force on the front wheels FL and FR and a relatively small braking force on the rear wheels RL and RR. The braking force control apparatus of the present embodiment is effective in providing a vehicle running stability when the emergency braking operation is performed.

In the above-described procedure of FIG. 7, in order to lower the rate of increase of the braking force on the rear wheels RL and RR, the time to start increasing the braking force on the rear wheels RR and RL is delayed from the time to start increasing the braking force on the front wheels FR and FL. However, the present invention is not limited to this embodiment. Alternatively, another method of lowering the rate of increase of the wheel cylinder pressure Pwc of each rear wheel cylinder may be used. Further, in the above-described procedure of FIG. 7, the delay time $T_{ALL}$ which defines a period during which the increasing of the wheel cylinder pressure Pwc of each rear wheel cylinder, after the start of the BA control, is inhibited is determined based on the vehicle speed V. However, the present invention is not limited to this embodiment. Alternatively, the delay time $T_{ALL}$ may be preset to a constant value.

Next, a description will be given of another embodiment of the braking force control apparatus of the present invention.

Figure 9:
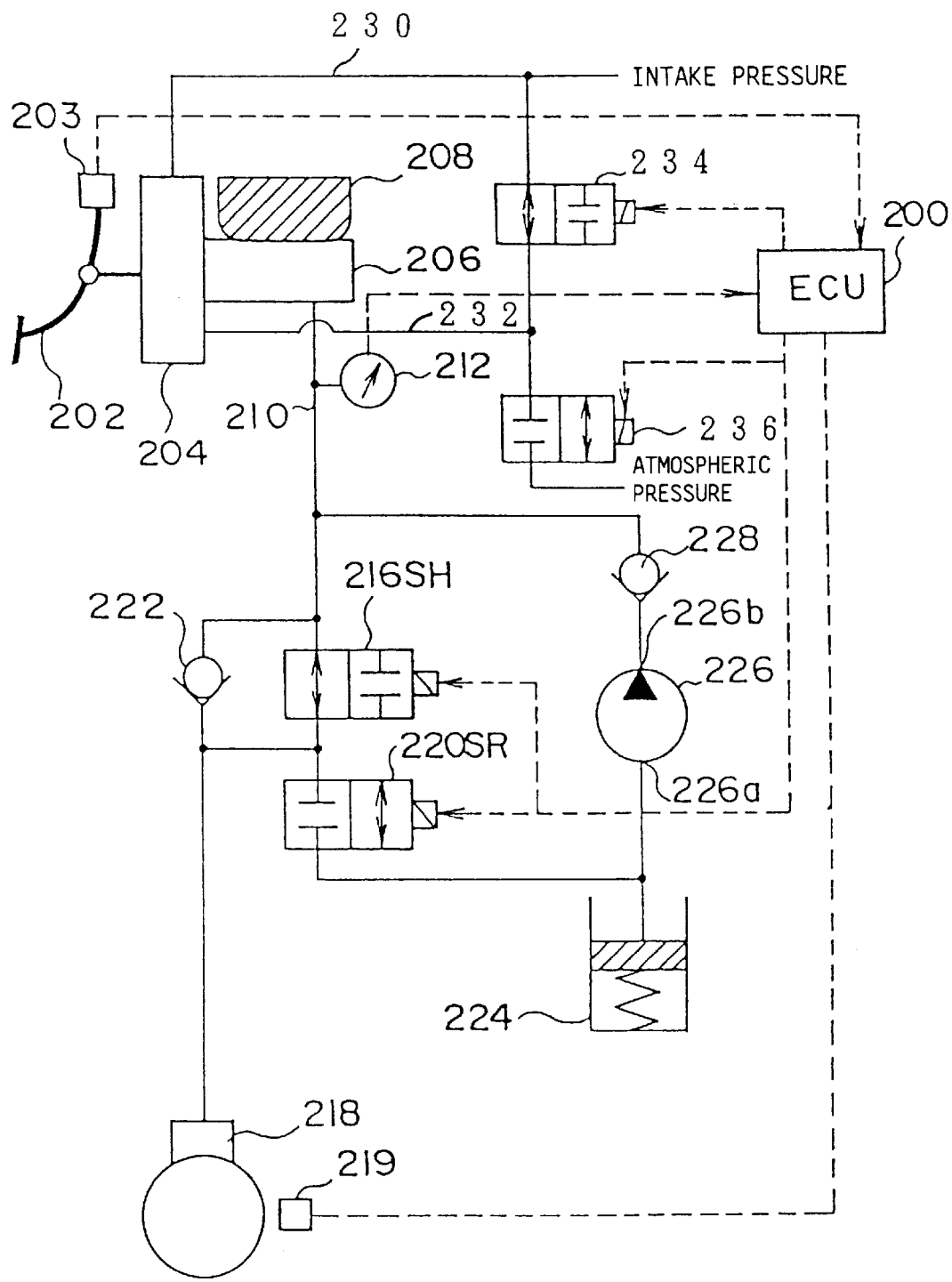
FIG. 9 is a system block diagram of a braking force control apparatus to which one of a third embodiment and a fourth embodiment of the present invention is applied.

FIG. 9 is a system block diagram of a braking force control apparatus to which one of a third embodiment and a fourth embodiment of the present invention is applied. For the sake of simplicity of description, a configuration of the braking force control apparatus having only one wheel cylinder provided for only one wheel of an automotive vehicle is illustrated in FIG. 9.

As shown in FIG. 9, the braking force control apparatus of the present embodiment is controlled by an electronic control unit 200 (hereinafter, called ECU 200). The braking force control apparatus of FIG. 9 includes a brake pedal 202. A brake switch 203 is provided in the vicinity of the brake pedal 202. When the brake pedal 202 is depressed by the vehicle operator, the brake switch 203 outputs an ON signal to the ECU 200. The ECU 200 determines whether the braking operation is performed by the vehicle operator, based on the signal supplied by the brake switch 203.

The brake pedal 202 is connected to a vacuum booster 204. The vacuum booster 204 serves to increase the braking operation force of the brake pedal 202 by using an intake pressure of air into an internal combustion engine of the vehicle. A master cylinder 206 is fixed to the vacuum booster 204. When the brake pedal 202 is depressed, a resultant force of the braking operation force Fp, exerted on the brake pedal 202, and a brake-assist force Fa, produced by the vacuum booster 204, is transmitted from the vacuum booster 204 to the master cylinder 206.

The master cylinder 206 includes a pressure chamber provided therein. A reservoir tank 208 is provided on the top of the master cylinder 206. When the braking operation force on the brake pedal 202 is released by the vehicle operator, the reservoir tank 208 is connected to or communicates with the pressure chamber of the master cylinder 206. When the brake pedal 202 is depressed by the vehicle operator, the reservoir tank 208 is disconnected from or isolated from the pressure chamber of the master cylinder 206. Hence, the pressure chamber of the master cylinder 206 is replenished with brake fluid from the reservoir tank 208 every time the braking operation force on the brake pedal 202 is released by the vehicle operator.

A hydraulic pressure line 210 is connected to the pressure chamber of the master cylinder 206. A hydraulic pressure sensor 212 is provided at an intermediate portion of the pressure line 210. The hydraulic pressure sensor 212 outputs a signal, indicative of the master cylinder pressure Pmc, to the ECU 10. The ECU 200 detects the master cylinder pressure Pmc, produced in the master cylinder 206, based on the signal supplied by the hydraulic pressure sensor 212.

A pressure-holding solenoid 216 (hereinafter called SH 216) is provided in the pressure line 210. The SH 216 is a two-position solenoid valve which is normally set in a valve-open position so as to connect the master cylinder 206 to a wheel cylinder 218. When a drive signal is supplied to the SH 216 by the ECU 200, the SH 216 is set in a valve-closed position so as to disconnect the master cylinder 206 from the wheel cylinder 218.

The wheel cylinder 218 is connected on the downstream side of the SH 216 to the pressure line 210. A pressure-reducing solenoid 220 (hereinafter called SR 220) is also connected on the downstream side of the SH 216 to the pressure line 210. The SR 220 is a two-position solenoid valve which is normally set in a valve-closed position so as to inhibit a flow of the brake fluid from the wheel cylinder 218 to a downstream portion of the pressure line 210 via the SR 220. When a drive signal is supplied to the SR 220 by the ECU 200, the SR 220 is set in a valve-open position so as to allow the flow of the brake fluid from the wheel cylinder 218 to the downstream portion of the pressure line 210 via the SR 220. In addition, a check valve 222 is provided in a bypass line of the pressure line 210 around the SH 216, and the bypass line is connected to the wheel cylinder 218. The check valve 222 allows only a flow of the brake fluid from the wheel cylinder 218 to the pressure line 210, and inhibits a counter flow of the brake fluid from the pressure line 210 to the wheel cylinder 218.

A wheel speed sensor 219 is provided in the vicinity of the wheel of the vehicle for which the wheel cylinder 218 is provided. The wheel speed sensor 219 outputs a signal, indicative of a wheel speed of the vehicle, to the ECU 200. The ECU 200 detects the wheel speed of the vehicle wheel based on the signal supplied by the wheel speed sensor 219.

A reservoir 224 is connected to the pressure line 210 on the downstream side of the SR 220. When the SR 220 is set in the valve-open position, the brake fluid from the SR 220 flows into the reservoir 224, and stored in the reservoir 224. In the reservoir 224, a certain amount of brake fluid is initially stored. A pump 226 is provided in the pressure line 210, and has an inlet port 226a which is connected to the reservoir 224. The pump 226 has an outlet port 226b which is connected to a check valve 228 in the pressure line 210. The check valve 228 is connected to the upstream side of the SH 216 through the pressure line 210. The check valve 228 allows only a flow of the brake fluid from the outlet port 216b of the pump 226 to the upstream side of the SH 216 in the pressure line 210, and inhibits a counter flow of the brake fluid from the upstream side of the SH 216 to the outlet port 226b of the pump 226.

An intake pressure line 230 and a pressure adjustment line 232 are connected to the vacuum booster 204. An intake pipe of the engine or the like is connected to the intake pressure line 230, and an intake pressure from the intake pipe is delivered through the intake pressure line 230 to the vacuum booster 204. The pressure adjustment line 232 is connected to both an intake pressure valve 234 and an atmospheric pressure valve 236. The intake pressure valve 234 is provided between the intake pressure line 230 and the pressure adjustment line 232. The intake pressure valve 234 is a two-position solenoid valve which is normally set in a valve-open position so as to connect the intake pressure line 230 and the pressure adjustment line 232. When a drive signal is supplied to the valve 234 by the ECU 200, the valve 234 is set in a valve-closed position so as to disconnect the pressure adjustment line 232 from the intake pressure line 230. The atmospheric pressure valve 236 is provided between the pressure adjustment line 232 and an atmospheric pressure line which is open to the atmosphere. The atmospheric pressure valve 236 is a two-position solenoid valve which is normally set in a valve-closed position so as to disconnect the pressure adjustment line 232 from the atmospheric pressure line. When a drive signal is supplied to the valve 236 by the ECU 200, the valve 236 is set in a valve-open position so as to connect the pressure adjustment line 232 and the atmospheric pressure line.

The vacuum booster 204 includes an intake pressure chamber and a pressure adjusting chamber both provided therein. In the vacuum booster 204, the intake pressure chamber and the pressure adjusting chamber are separated from each other by a diaphragm. The intake pressure chamber is connected to the intake pressure line 230. When the vehicle is normally running, the intake pressure chamber of the vacuum booster 204 is held at a vacuum pressure of the intake pressure of the intake pressure line 230. The pressure adjusting chamber of the vacuum booster 204 is connected to the pressure adjustment line 232 through a valve device. The valve device is provided in the vacuum booster 204 to adjust an internal pressure of the pressure adjusting chamber in accordance with the braking operation of the brake pedal 202.

The operation of the valve device of the vacuum booster 204 will now be described. When the intake pressure from the intake pressure valve 234 is supplied to the pressure adjustment line 232, the valve device connects the pressure adjusting chamber to the pressure adjustment line 232 until a difference in pressure between the pressure adjusting chamber and the intake pressure chamber is produced in proportion to the braking operation force Fp on the brake pedal 202 by the vehicle operator. An actuating force which is proportional to the difference in pressure between the pressure adjusting chamber and the intake pressure chamber (or in proportion to the braking operation force Fp) is exerted on the diaphragm between the pressure adjusting chamber and the intake pressure chamber. Therefore, when the brake pedal 202 is depressed, the brake-assist force Fa is produced by the vacuum booster 204 in accordance with the actuating force on the diaphragm, so that a resultant force of the braking operation force Fp and the brake-assist force Fa is transmitted from the vacuum booster 204 to the master cylinder 206.

On the other hand, when the atmospheric pressure from the atmospheric pressure valve 236 is supplied to the pressure adjusting line 232, the valve device of the vacuum booster 204 connects the pressure adjusting chamber to the pressure adjustment line 232 so that the atmospheric pressure is supplied to the pressure adjusting chamber by the valve device, regardless of whether the braking operation force Fp on the brake pedal 202. An actuating force which is proportional to the difference in pressure between the pressure adjusting chamber and the intake pressure chamber is exerted on the diaphragm between the pressure adjusting chamber and the intake pressure chamber. At this time, a maximum brake-assist force FaMAX is produced in accordance with the actuating force on the diaphragm by the vacuum booster 204.

Next, a description will be given of the operation of the braking force control apparatus of the present embodiment.

Similar to the ECU 10 of FIG. 1 in the previous embodiment, the ECU 200 of FIG. 9 in the present embodiment starts the control procedure of FIG. 3 when a braking operation of the brake pedal 202 is performed. The control procedure of FIG. 3 is performed in order to make a determination as to whether the brake-assist (BA) control execution conditions are satisfied by the braking operation. Namely, after the brake pedal 202 is depressed by the vehicle operator, the ECU 200 determines whether the BA control execution conditions are satisfied by the braking operation, based on the master cylinder pressure Pmc and the master cylinder pressure change rate dPmc. When the ECU 200 determines that the BA control execution conditions are not satisfied, the normal control is executed. When the ECU 200 determines that the BA control execution conditions are satisfied, the execution of one of (1) the brake-assist (BA) regular control and (2) the brake-assist (BA) starting specific control is started in accordance with the vehicle speed V.

When the normal control is performed by the ECU 200 of the braking force control apparatus of the present embodiment, the intake pressure valve 234 is set in the valve-open position (or the OFF state) and the atmospheric pressure valve 236 are set in the valve-closed position (or the OFF state). In this condition, the vacuum booster 204 produces the brake-assist force Fa in accordance with the braking operation force Fp as described above. A resultant force of the braking operation force Fp and the brake-assist force Fa is transmitted from the vacuum booster 204 to the master cylinder 206. In addition, when the resultant force of the braking operation force Fp and the brake-assist force Fa is transmitted to the master cylinder 206, the master cylinder 206 produces a master cylinder pressure Pmc that is equal to the braking operation force Fp multiplied by a given magnification factor.

When the operating condition of the vehicle is found stable, the ECU 200 maintains the pump 226 in the stopped condition, sets the SH 216 in the valve-open position, and sets the SR 220 in the valve-closed position. Hereinafter, this condition of the hydraulic circuit related to the wheel cylinder 218 will be called the normal condition. When the hydraulic circuit related to the wheel cylinder 218 is placed in the normal condition, the master cylinder pressure Pmc from the master cylinder 206 is supplied to the wheel cylinder 218 through the SH 216. Hence, during the normal control, the wheel cylinder 218 generates a braking force on the vehicle wheel in accordance with the braking operation force Fp on the brake pedal 202.

When the slip ratio S of the vehicle wheel is found to be above a reference value after the braking operation is performed in the braking force control apparatus of the present embodiment, it is determined that the ABS control execution conditions are satisfied. After this determination is made, the execution of the ABS control of the braking force control apparatus is started by the ECU 200 in the present embodiment, similar to the ECU 10 in the previous embodiment. When the brake pedal 202 is depressed, or when the master cylinder pressure Pmc is increased to an adequately high pressure, the ABS control is achieved by the ECU 200. That is, during the ABS control, the ECU 200 starts the operation of the pump 226, and supplies the drive signals to the SH 216 and the SR 220 in the following manner.

During the ABS control of the present embodiment, if the adequately increased master cylinder pressure Pmc is supplied by the master cylinder 206, the ECU may control the SH 216 and the SR 220 such that the SH 216 is set in the valve-open position and the SR 220 is set in the valve-closed position. When the ECU 200 performs this control procedure, the wheel cylinder pressure Pwc of the wheel cylinder 218 is increased up to the master cylinder pressure Pmc. Hereinafter, this control procedure will be called (1) a pressure-increasing control mode.

Alternatively, during the ABS control of the present embodiment, the ECU 200 may control the SH 216 and the SR 220 such that the SH 216 is set in the valve-closed position and the SR 220 is set in the valve-closed position. When the ECU 200 performs this control procedure, the wheel cylinder pressure Pwc of the wheel cylinder 218 is maintained at the same level without increase or decrease. Hereinafter, this control procedure will be called (2) a pressure-holding control mode.

Alternatively, during the ABS control of the present embodiment, the ECU 200 may control the SH 216 and the SR 220 such that the SH 216 is set in the valve-closed position and the SR 220 is set in the valve-open position. When the ECU 200 performs this control procedure, the wheel cylinder pressure Pwc of the wheel cylinder 218 is decreased. Hereinafter, this control procedure will be called (3) a pressure-decreasing control mode.

In the braking force control apparatus of the present embodiment, the ECU 200 suitably performs one of (1) the pressure-increasing control mode, (2) the pressure-holding control mode and (3) the pressure-decreasing control mode so as to maintain the slip ratio S of the vehicle wheel below the reference value, preventing the vehicle wheel from being locked during the braking operation.

It is necessary to quickly decrease the wheel cylinder pressure Pwc of the wheel cylinder 218 after the vehicle operator releases the braking operation force on the brake pedal 202 during the ABS control. In the braking force control apparatus of the present embodiment, the check valve 222 is provided in the bypass line connected to the wheel cylinder 218 so as to allow only the flow of the brake fluid from the wheel cylinder 218 to the pressure line 210. As the check valve 222 functions in this manner, it is possible for the braking force control apparatus of the present embodiment to quickly decrease the wheel cylinder pressure Pwc after the vehicle operator releases the braking operation force on the brake pedal 202 during the ABS control.

During the ABS control of the braking force control apparatus of the present embodiment, the wheel cylinder pressure Pwc of the wheel cylinder 218 is suitably adjusted by supplying the master cylinder pressure Pmc from the master cylinder 206 to the wheel cylinder 218. When the brake fluid from the master cylinder 206 is delivered to the wheel cylinder 218, the wheel cylinder pressure Pwc is increased, and, when the brake fluid within the wheel cylinder 218 is delivered to the reservoir 224, the wheel cylinder pressure Pwc is decreased. If the increase of the wheel cylinder pressure Pwc is performed by using the master cylinder 206 as the only brake fluid pressure source, the brake fluid contained in the master cylinder 206 is gradually decreased through a repeated execution of the pressure-increasing control mode and the pressure-decreasing control mode. However, in the present embodiment, the brake fluid contained in the reservoir 224 is returned back to the master cylinder 206 by the pump 226. Therefore, it is possible to prevent the master cylinder 206 from malfunctioning due to a too small amount of the brake fluid contained therein even when the ABS control is continuously performed over an extended period of time.

Next, a description will be given of the operation of the braking force control apparatus of the present embodiment when the brake-assist (BA) control is performed by the ECU 200.

When the vehicle is running at a high speed above the reference speed V1 and an emergency braking operation is performed, the ECU 200 starts the execution of the BA control by performing the BA regular control. In the present embodiment, the BA regular control is achieved by the ECU 200 by setting the intake pressure valve 234 in the valve-closed position, setting the atmospheric pressure valve 236 in the valve-open position, setting the SH 216 in the valve-open position, setting the SR 220 in the valve-closed position, and stopping the operation of the pump 226.

When the hydraulic circuit related to the wheel cylinder 218 is placed in the above-mentioned condition, the atmospheric pressure from the atmospheric pressure valve 236 is supplied to the pressure adjustment line 232. When the atmospheric pressure is supplied to the pressure adjustment line 232, the atmospheric pressure is supplied to the pressure adjusting chamber of the vacuum booster 204 by the valve device thereof, and the vacuum booster 204 produces the maximum brake-assist force FaMAX. A resultant force of the braking operation force Fp and the maximum brake-assist force FaMAX is transmitted to the master cylinder 206 by the vacuum booster 204. The master cylinder pressure Pmc from the master cylinder 206 is supplied to the wheel cylinder 218 through the SH 216. Hence, after the start of the BA regular control, the wheel cylinder pressure Pwc of the wheel cylinder 218 can be quickly increased in accordance with a change of the force transmitted to the master cylinder 206 from the resultant force "Fa+Fp" to the resultant force "FaMAX+Fp".

In the braking force control apparatus of the present embodiment, when an emergency braking operation of the brake pedal 202 is performed, it is possible to quickly increase the wheel cylinder pressure Pwc of the wheel cylinder 218 to the adequately high level. Therefore, in the braking force control apparatus of the present embodiment, after the condition requiring the emergency braking has occurred, it is possible to quickly generate an increased braking force larger than that generated during the normal control even if the vehicle operator is a beginner.

When the vehicle is running at a low speed below the reference speed V1 and an emergency braking operation is performed, the ECU 200 starts the execution of the BA control by performing the BA starting specific control. In the present embodiment, the BA starting specific control is achieved by the ECU 200 by setting the intake pressure valve 234 in the valve-closed position, setting the atmospheric pressure valve 236 in the valve-open position, stopping the operation of the pump 226, and performing a brake-assist starting specific control procedure shown in FIG. 10.

Figure 10:
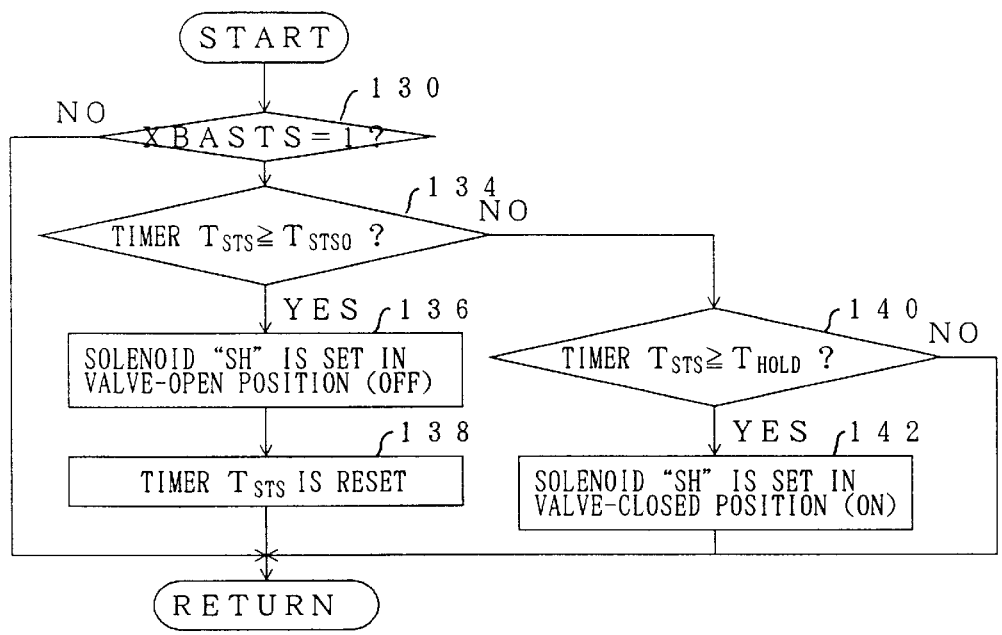
FIG. 10 is a flowchart for explaining a brake-assist starting specific control procedure performed by the braking force control apparatus of FIG. 9.

FIG. 10 is a flowchart for explaining a brake-assist (BA) starting specific control procedure performed by the ECU 200 of the braking force control apparatus of FIG. 9. The third embodiment of the present invention is constituted by the ECU 200 of the braking force control apparatus of FIG. 9 when performing the control procedures of FIG. 3 and FIG. 10, which will now be described.

The BA starting specific control procedure of FIG. 10 is performed in order to lower in an appropriate manner the rate of increase of the wheel cylinder pressure Pwc accompanied by the start of the BA control. The control procedure of FIG. 10 is essentially the same as the control procedure of FIG. 4 except the step 132 shown in FIG. 4 is not included in the control procedure of FIG. 10. In FIG. 10, the steps which are the same as corresponding steps in FIG. 4 are designated by the same reference numerals. Hence, a description of each of the respective steps of the control procedure of FIG. 10 will be omitted.

In the BA starting specific control procedure of FIG. 10, after the flag XBASTS is set to 1, the wheel cylinder pressure Pwc is continuously increased toward the accumulator pressure Pacc until the hold time $T_{HOLD}$ elapses after the timer $T_{STS}$ is reset to zero. When the hold time $T_{HOLD}$ passed but the reference time $T_{STS0}$ has not yet elapsed, the supply of the accumulator pressure Pacc to the wheel cylinder 218 is stopped and the wheel cylinder pressure Pwc is maintained at the same level. In this manner, the pressure increasing of the wheel cylinder 218 and the pressure holding of the wheel cylinder 218 are repeated every time the reference time $T_{STS}$ elapses after the timer $T_{STS}$ is reset to zero. Therefore, by performing the BA starting specific control procedure of FIG. 10, it is possible to lower in an appropriate manner the rate of increase of the braking force accompanied by the start of the BA starting specific control, in comparison with the rate of increase of the braking force accompanied by the start of the BA regular control. Hence, when an emergency braking operation of the brake pedal 202 is performed during a low-speed running of the vehicle, the braking force control apparatus of the present embodiment can increase the wheel cylinder pressure Pwc at a lowered rate of increase while preventing an unnecessarily large deceleration from being produced by the start of the BA control. The braking force control apparatus of the present embodiment is effective in achieving the functions of the BA control without degrading the ride comfort of the vehicle occupant.

After the wheel cylinder pressure Pwc is increased by the start of the BA control as described above, an increased braking force is exerted on the vehicle, and a relatively large slip ratio S of the vehicle wheel is produced. Then, the ECU 200 determines that the ABS control execution conditions are satisfied by such an operating condition of the vehicle. After this determination is made, the ECU 200 starts the execution of the ABS control of the braking force controlling apparatus of the present embodiment. As described above, the ECU 200 suitably performs one of (1) the pressure-increasing control mode, (2) the pressure-holding control mode and (3) the pressure-decreasing control mode so as to maintain the slip ratio S of the vehicle wheel below the reference value, preventing the vehicle wheel from being locked during the braking operation.

In the braking force controlling apparatus of the present embodiment, when a braking operation force Fp is exerted on the brake pedal 202 by the vehicle operator after the start of the brake-assist control, the master cylinder pressure Pmc is maintained at a level in accordance with the resultant force "FAMAX+Fa" supplied by the vacuum booster 204. When the braking operation force on the brake pedal 202 is released by the vehicle operator after the start of the brake-assist control, the master cylinder pressure Pmc is decreased to a level in accordance with the maximum brake-assist force "FaMAX" supplied by the vacuum booster 204.

The ECU 200 monitors the signal supplied by the hydraulic pressure sensor 212, and makes a determination as to whether the braking operation force on the brake pedal 202 is released by the vehicle operator, based on the signal supplied by the hydraulic pressure sensor 212. When it is determined that the braking operation force is released, the ECU 200 stops supplying the drive signals to the valves 234 and 236 and terminates the brake-assist control.

Similar to the previous embodiment of FIG. 1, the braking force controlling apparatus of the present embodiment can quickly generate a large braking force on the vehicle when an emergency braking operation is performed during a high-speed running of the vehicle. Further, when an emergency braking operation is performed during a low-speed running of the vehicle, the braking force control apparatus of the present embodiment can increase the wheel cylinder pressure Pwc at a lowered rate of increase while preventing an unnecessarily large deceleration from being produced by the start of the BA control. Therefore, the braking force control apparatus of the present embodiment is effective in achieving the functions of the BA control for all the ranges of the vehicle speed V without degrading the ride comfort of the vehicle occupant.

Figure 11:
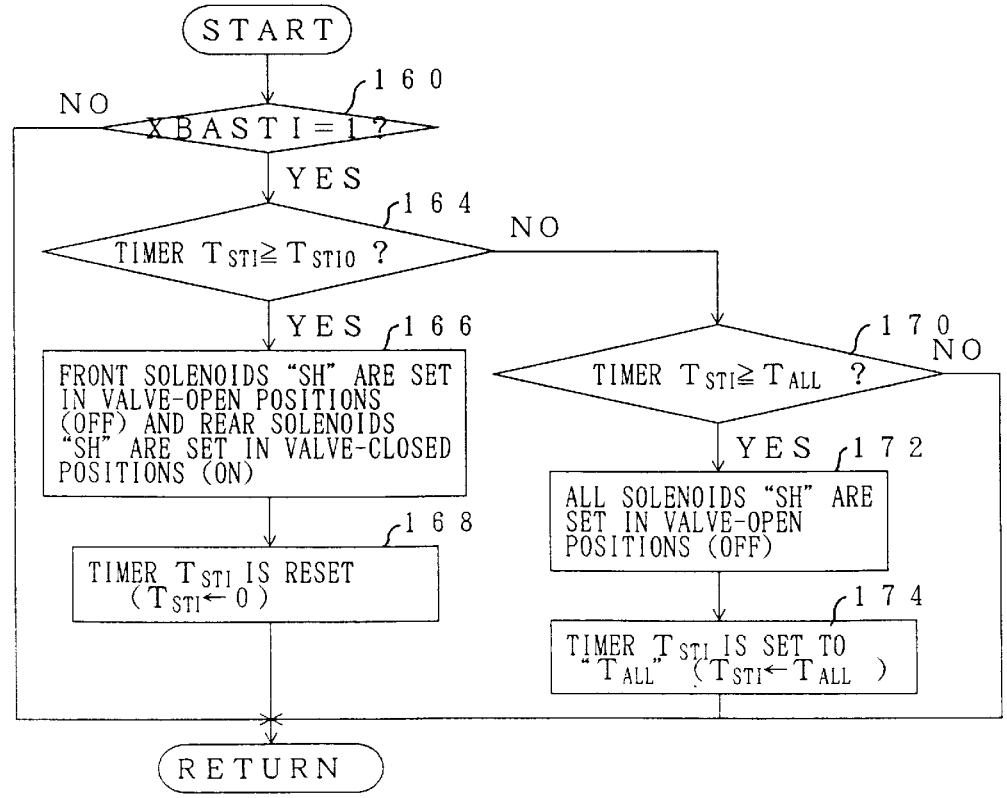
FIG. 11 is a flowchart for explaining a brake-assist starting independent control procedure performed by the braking force control apparatus of FIG. 9.

FIG. 11 is a flowchart for explaining a brake-assist (BA) starting independent control procedure performed by the ECU 200 of the braking force control apparatus of FIG. 9. The fourth embodiment of the present invention is constituted by the ECU 200 of the braking force control apparatus of FIG. 9 when performing the control procedures of FIG. 6 and FIG. 11, which will now be described.

In the present embodiment, the ECU 200 performs the normal control when it is determined that an emergency braking operation is not performed. Further, (1) when the vehicle is running at a high speed above the reference speed V2 and an emergency braking operation is performed, the ECU 200 starts the execution of the BA control by performing the BA regular control procedure. Further, (2) when the vehicle is running is running a low speed below the reference speed V2 and an emergency braking operation is performed, the ECU 200 starts the execution of the BA control by performing the BA starting independent control procedure.

The normal control and the BA regular control are achieved by the ECU 200 in the present embodiment in the same manner as the ECU 200 in the above-described third embodiment. Hence, a description of these control procedures will be omitted. The BA starting independent control is achieved by the ECU 200 by setting the intake pressure valve 234 in the valve-closed position (or the ON state), setting the atmospheric pressure valve 236 in the valve-open position (or the On state), stopping the operation of the pump 226, and performing the control procedure of FIG. 11.

The BA starting independent control procedure of FIG. 11 is performed by the ECU 200 wherein the time the braking force on the rear wheels RR and RL is increased by the start of the BA control is delayed from the time the braking force on the front wheels FR and FL is increased by the start of the BA control, in order to lower in an appropriate manner the rate of increase of the braking force accompanied by the start of the BA control. The BA starting independent control is achieved by the ECU 200 when performing the BA starting independent control procedure of FIG. 11. The control procedure of FIG. 11 is essentially the same as the control procedure of FIG. 7 except the step 162 shown in FIG. 7 is not included in the control procedure of FIG. 11. In FIG. 11, the steps which are the same as corresponding steps in FIG. 7 are designated by the same reference numerals. Hence, a description of each of the respective steps of the control procedure of FIG. 11 will be omitted.

In the BA starting independent control procedure of FIG. 11, after the flag XBASTI is set to 1, only the wheel cylinder pressure Pwc of each of the front wheel cylinders 44FR and 44FL is increased toward the accumulator pressure Pacc until the delay time $T_{ALL}$ elapses after the timer $T_{STI}$ is reset to zero. When the delay time $T_{ALL}$ passed but the flag XBASTI is not reset to zero, the supply of the accumulator pressure Pacc to all the wheel cylinders 44 is allowed by the pressure-holding solenoids SH and the wheel cylinder pressure Pwc of each of the wheel cylinders 44 is quickly increased toward the accumulator pressure Pacc by the pressure-holding solenoids SH. In this manner, the time to start increasing the braking force on the rear wheels RR and RL after the start of the BA control is delayed from the time to start increasing the braking force on the front wheels FR and FL after the start of the BA control. Therefore, by performing the BA starting independent control procedure of FIG. 11, it is possible for the braking force control apparatus of the present embodiment to lower in an appropriate manner the rate of increase of the entire braking force accompanied by the start of the BA starting independent control, in comparison with the rate of increase of the braking force accompanied by the start of the BA regular control.

Similar to the previous embodiments, the braking force control apparatus of the present embodiment is effective in achieving the functions of the BA control for all the ranges of the vehicle speed V without degrading the ride comfort of the vehicle occupant. Further, in the present embodiment, by performing the BA starting independent control procedure of FIG. 11 when an emergency braking operation is detected, the braking force control apparatus initially generates a relatively large braking force on the front wheels FL and FR and a relatively small braking force on the rear wheels RL and RR. The braking force control apparatus of the present embodiment is effective in providing a vehicle running stability when the emergency braking operation is performed.

As described above, the braking force control apparatus of the present invention can change a rate of increase of the braking force produced after the start of the brake-assist control, so as to prevent an unnecessarily large deceleration from being produced by the start of the brake-assist control during a low-speed running of the vehicle. Hence, the braking force control apparatus of the present invention is effective in achieving the functions of the brake-assist control in an appropriate manner for all the ranges of the vehicle speed without degrading the ride comfort of the vehicle occupant.

In addition, the braking force control apparatus of the present invention can safely lower the sensed deceleration of the vehicle occupant when the brake-assist control is started during a low-speed running of the vehicle. Hence, the braking force control apparatus of the present invention is effective in achieving the functions of the brake-assist control while providing a good ride comfort of the vehicle occupant for all the ranges of the vehicle speed.

Further, the braking force control apparatus of the present invention can change a rate of increase of the braking force exerted on the rear wheels after the start of the brake-assist control, and can change a rate of increase of the entire braking force exerted on the vehicle after the start of the brake-assist control in accordance with the vehicle speed. Hence, the braking force control apparatus of the present invention is effective in achieving the functions of the brake-assist control in an appropriate manner for all the ranges of the vehicle speed without degrading the ride comfort of the vehicle occupant.

Further, the braking force control apparatus of the present invention can delay the time to start increasing the braking force on the rear wheels after the start of the brake-assist control from the time to start increasing the braking force on the front wheels after the start of the brake-assist control, and can change a rate of increase of the entire braking force exerted on the vehicle after the start of the brake-assist control in accordance with the vehicle speed. Hence, the braking force control apparatus of the present invention is effective in providing a vehicle running stability when the emergency braking operation is performed.

Further, the present invention is not limited to the above-described embodiments, and variations and modifications may be made without departing from the scope of the present invention.

What is claimed is:

1. A braking force control apparatus, comprising:
   means for performing a normal control to generate a braking force on a vehicle in accordance with a braking operation force;
   means for performing a brake-assist control to generate an increased braking force larger than the braking force generated during the normal control; and
   a braking force increasing characteristic change means for changing a rate of increase of the braking force, which is produced after a start of the brake-assist control, in accordance with a vehicle speed.

2. The apparatus according to claim 1, wherein the braking force increasing characteristic change means decreases the rate of increase of the braking force in accordance with a decrease in the vehicle speed.

3. The apparatus of according to claim 1, wherein the braking force increasing characteristic change means decreases a rate of increase of braking force on rear wheels of the vehicle in accordance with a decrease in the vehicle speed.

4. The apparatus of according to claim 1, wherein the braking force increasing characteristic change means delays a time to start increasing a braking force on rear wheels of the vehicle after the start of the brake-assist control from a time to start increasing a braking force on front wheels of the vehicle after the start of the brake-assist control by a delay time, wherein the delay time is increased in accordance with a decrease in the vehicle speed.

5. The apparatus of according to claim 1, wherein the braking force increasing characteristic change means further includes:
   a means for determining whether the vehicle speed at a time of the start of the brake-assist control is larger than a predetermined threshold value;
   a means for starting a first brake-assist control when said vehicle speed is larger that the predetermined threshold value, the rate of increase of the braking force being unchanged by the start of the first brake-assist control;

a means for starting a second brake-assist control when said vehicle speed is not larger than the predetermined threshold value, the rate of increase of the braking force being lowered by the start of the second brake-assist control; and a means for carrying out the second brake-assist control in the braking force control apparatus when the second brake-assist control is started by the means for starting the second brake-assist control.

6. The apparatus according to claim 1, wherein the braking force increasing characteristic change means further includes:

a means for determining whether vehicle speed at a time of the start of the brake-assist is larger than a predetermined threshold value;

a means for starting a first brake-assist control when said vehicle speed is larger than the predetermined threshold value, the rate of increase of the braking force being unchanged by the start of the first brake-assist control;

a means for starting a second brake-assist control when said vehicle speed is not larger than the predetermined threshold value, a rate of increase of a braking force on rear wheels of the vehicle being lowered by the start of the second brake-assist control; and a means for carrying out the second brake-assist control in the braking force control apparatus by lowering the rate of the braking force on the rear wheels when the second brake-assist control is started by the means for starting the second brake-assist control.

7. The apparatus according to claim 1, wherein the apparatus further includes a means for determining a time delay based on a master cylinder pressure and a master cylinder pressure change rate, wherein a time to start the brake-assist control is determined based on the delay time.

8. The apparatus according to claim 1, wherein the apparatus further includes a means for determining whether the brake-assist control is currently performed, wherein, when said means for determining determines that the brake-assist control is not currently performed, the braking force increasing characteristic change means changes the rate of increase of the braking force after the start of the brake-assist control, in accordance with the vehicle speed.

9. The apparatus according to claim 1, wherein the apparatus further includes a means for determining whether an emergency braking operation is performed, based on a master cylinder pressure and a master cylinder pressure change rate, wherein, when said means for determining determines that the emergency braking operation is performed, the braking force increasing characteristic change means changes the rate of increase of the braking force after the start of the brake-assist control, in accordance with the vehicle speed.

10. The apparatus according to claim 6, wherein the braking force increasing characteristic change means delays a time to start increasing a braking force on rear wheels of the vehicle accompanied by the start of the brake-assist control from a time to start increasing a braking force on front wheels of the vehicle produced after the start of the brake-assist control by a delay time, wherein the delay time is increased in accordance with a decrease in the vehicle speed.

* * * * *